United States Patent
Kato et al.

(10) Patent No.: US 9,010,739 B2
(45) Date of Patent: Apr. 21, 2015

(54) VIBRATION ISOLATION DEVICE AND MANUFACTURING METHOD THEREOF

(75) Inventors: Hironori Kato, Osaka (JP); Toshifumi Sakata, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 223 days.

(21) Appl. No.: 13/582,876

(22) PCT Filed: Jan. 31, 2011

(86) PCT No.: PCT/JP2011/051961
§ 371 (c)(1),
(2), (4) Date: Sep. 5, 2012

(87) PCT Pub. No.: WO2011/114784
PCT Pub. Date: Sep. 22, 2011

(65) Prior Publication Data
US 2012/0319337 A1 Dec. 20, 2012

(30) Foreign Application Priority Data

Mar. 19, 2010 (JP) .................................. 2010-065032
Aug. 25, 2010 (JP) .................................. 2010-188578

(51) Int. Cl.
*F16F 7/00* (2006.01)
*F16F 1/38* (2006.01)

(52) U.S. Cl.
CPC ...................................... *F16F 1/3863* (2013.01)

(58) Field of Classification Search
USPC ................... 267/292–294, 141, 141.1–141.5, 267/140.12, 140.13
See application file for complete search history.

(56) References Cited

U.S. PATENT DOCUMENTS

| | | | | |
|---|---|---|---|---|
| 5,707,048 A | * | 1/1998 | Kuzukawa et al. | 267/140.13 |
| 6,419,213 B2 | * | 7/2002 | Murai | 267/140.12 |
| 6,598,863 B2 | * | 7/2003 | Kato | 267/140.12 |

(Continued)

FOREIGN PATENT DOCUMENTS

| | | | |
|---|---|---|---|
| EP | 418718 A1 | * | 3/1991 |
| JP | 04181036 A | * | 6/1992 |
| JP | 05202980 A | * | 8/1993 |

(Continued)

OTHER PUBLICATIONS

International Search Report for PCT/JP2011/051961, mailing date of Mar. 8, 2011.

*Primary Examiner* — Melanie Torres Williams
(74) *Attorney, Agent, or Firm* — Westerman, Hattori, Daniels & Adrian, LLP

(57) ABSTRACT

Provided is a vibration isolation device such that weight reduction can be achieved and it is possible to simplify the structure of a resin molding die for molding the bracket member. Engagement in a direction where the external member (60) slips out of the bracket member (30) occurs in a structure achieved in such a way that a pair of first wall section parts (62) of the external member (60) are installed inside the bracket member (30). As a result, it is possible to curb a situation where, as in the case of conventional vibration damping devices, undercut shapes are formed. Consequently, it is possible to simplify the structure of the resin molding die for molding the bracket member (30). Furthermore, as regards the external member (60), a portion between the leg sections (50), which form a pair, is omitted, and therefore, weight can be reduced correspondingly.

8 Claims, 27 Drawing Sheets

(56) References Cited

U.S. PATENT DOCUMENTS

| | | | |
|---|---|---|---|
| 6,715,745 B2 * | 4/2004 | Nakada et al. | 267/140.13 |
| 2009/0189323 A1 * | 7/2009 | Endo | 267/140.12 |

FOREIGN PATENT DOCUMENTS

| | | |
|---|---|---|
| JP | 06174006 A * | 6/1994 |
| JP | 09-170634 A | 6/1997 |
| JP | 09-170635 A | 6/1997 |
| JP | 09-273596 A | 10/1997 |
| JP | 10-082442 A | 3/1998 |
| JP | 11-063106 A | 3/1999 |
| JP | 2007-177827 A | 7/2007 |

* cited by examiner

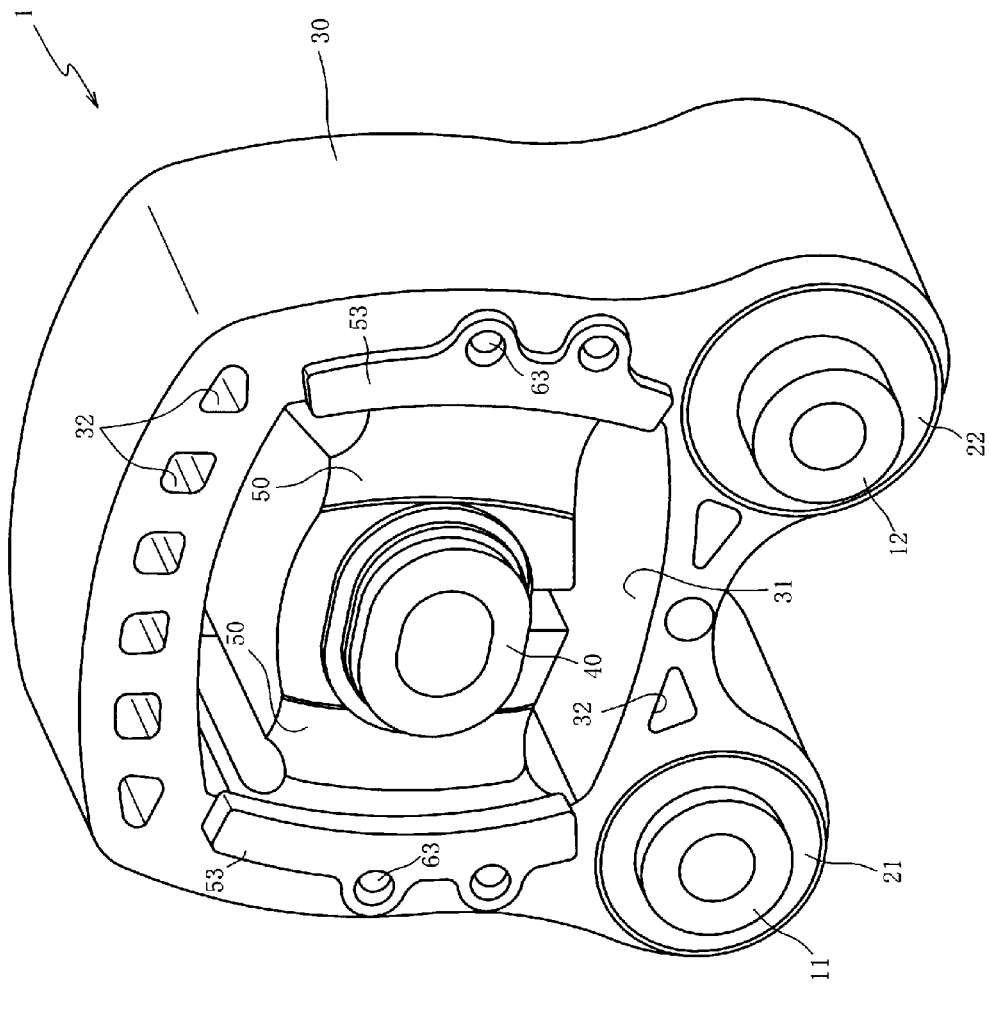
FIG. 1
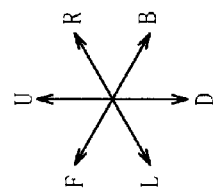

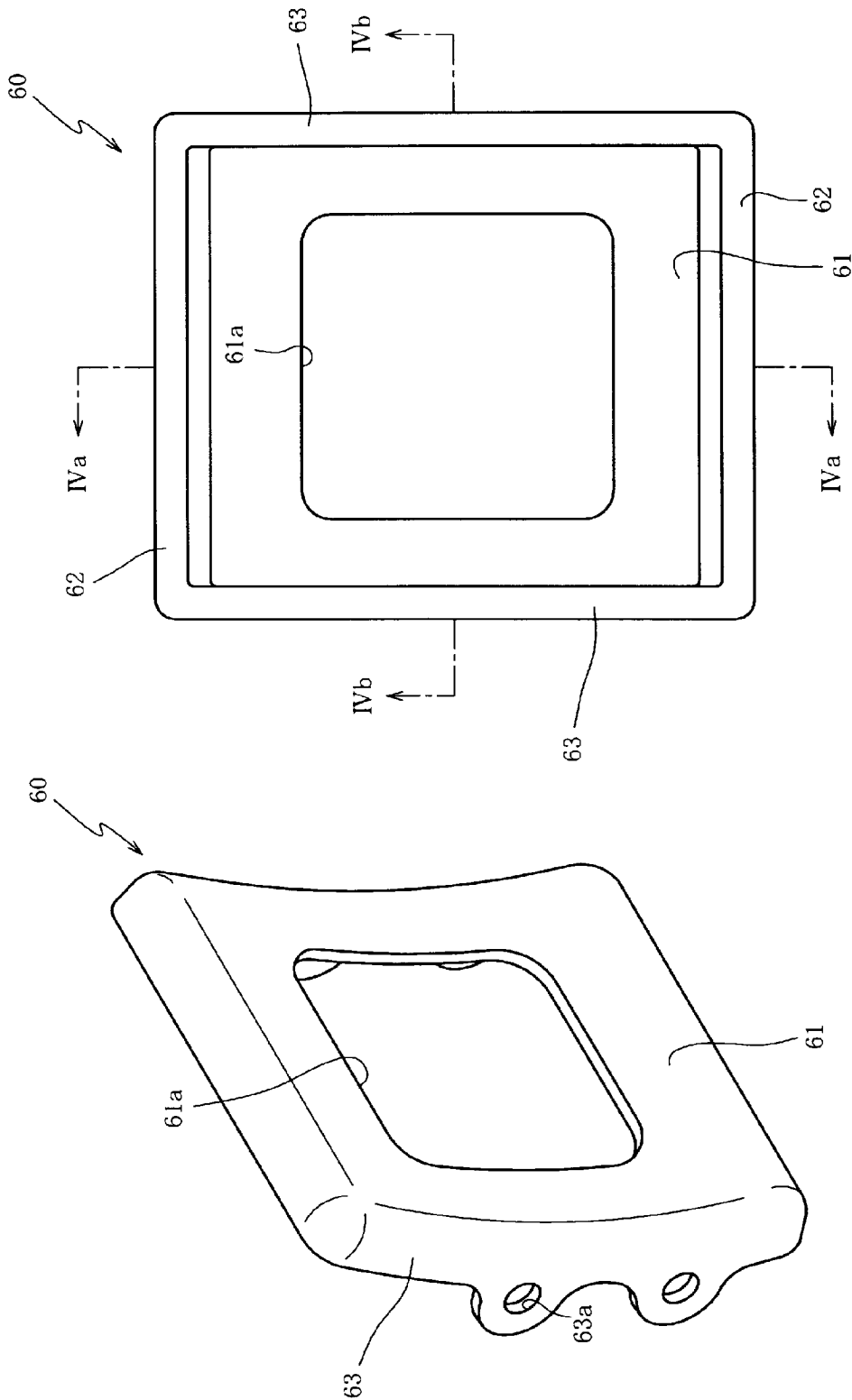

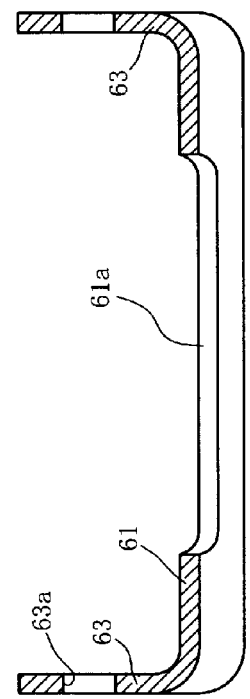
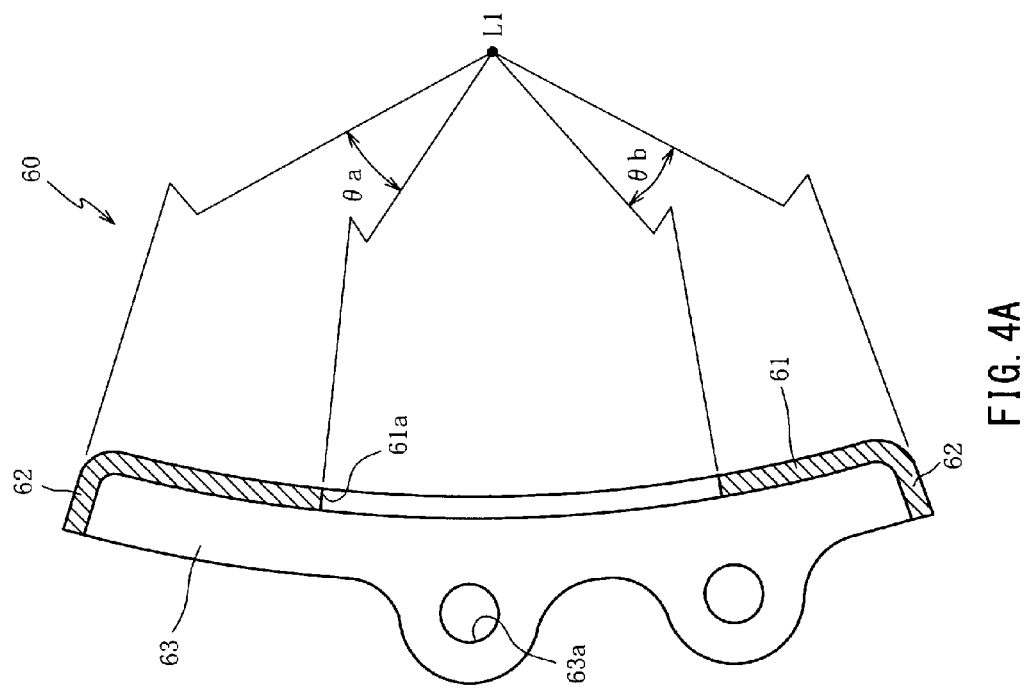
FIG. 4A
FIG. 4B

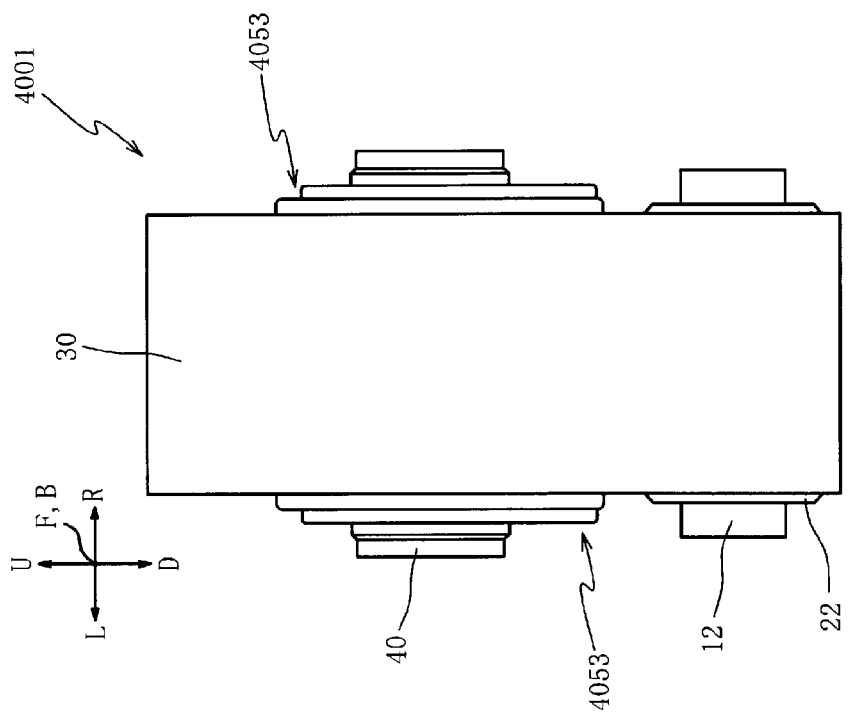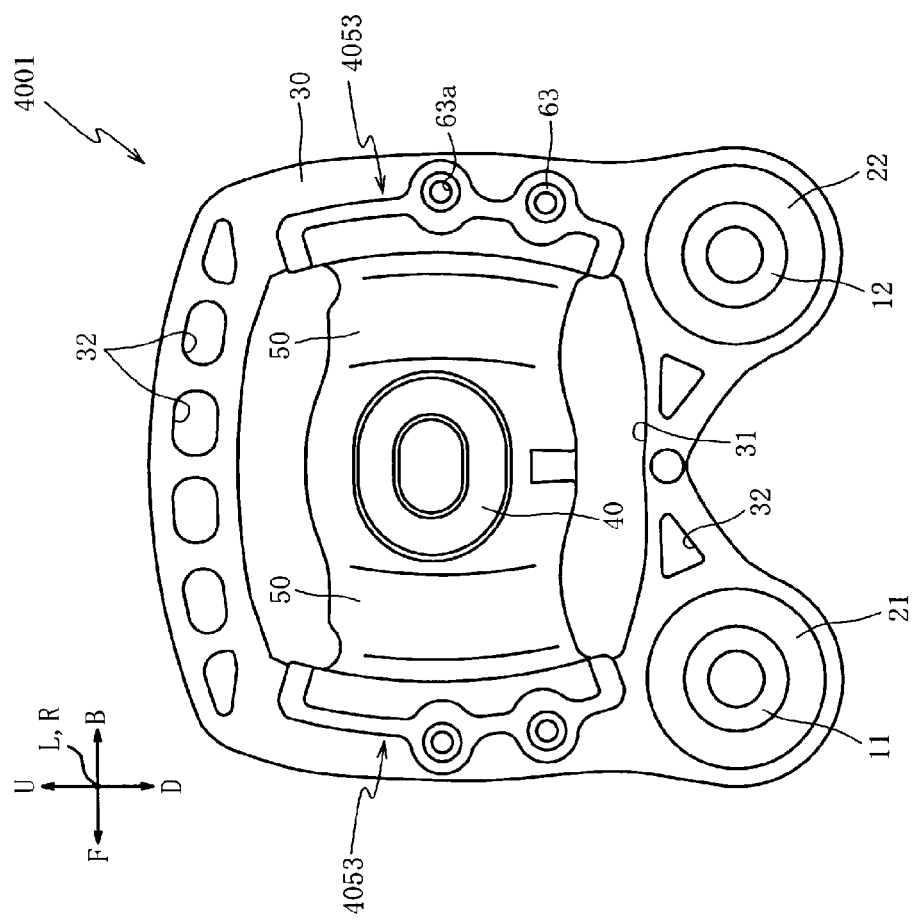

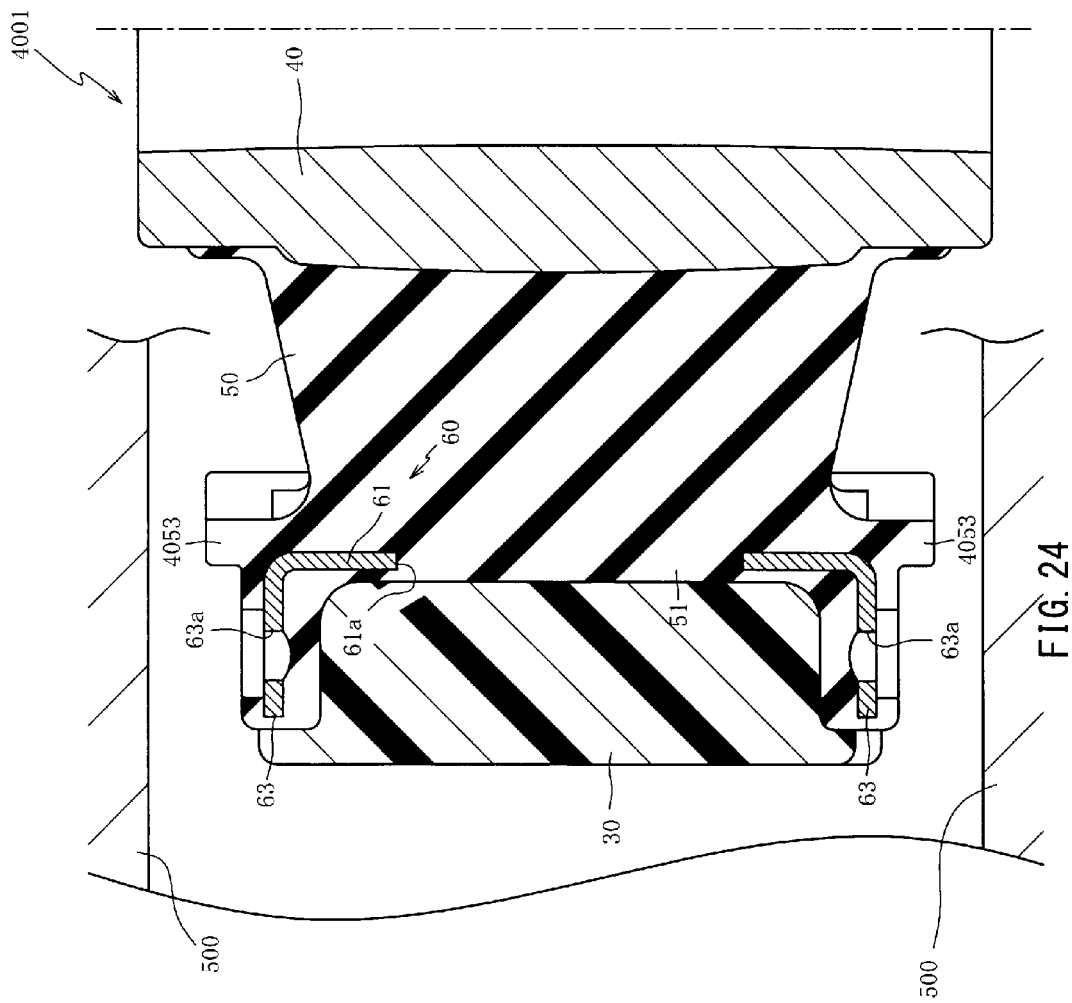
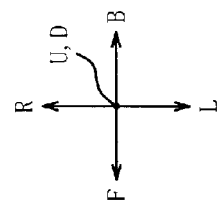
FIG. 24 ated to the vehicle body side, an inner cylinder member insertingly arranged in the insertion hole is attached to the vibration source (an engine, motor, transmission and the like for example) side, and the inner periphery side of the insertion hole and the outer periphery side of the inner cylinder member are connected to each other by vibration isolation leg parts formed of a rubber-like elastic body.

VIBRATION ISOLATION DEVICE AND MANUFACTURING METHOD THEREOF

TECHNICAL FIELD

The present invention relates to a vibration isolation device, and relates more specifically to a vibration isolation device that can reduce the weight, can simplify the structure of a resin molding mold molding the bracket member in a structure in which external members to which vibration isolation leg parts are adhered are fixed by mechanical engagement with a bracket member formed of a resin material, and can suppress generation of a bur in insert-molding and can secure a stopper function by the vibration isolation leg parts in a structure in which the vibration isolation leg parts formed of a rubber-like elastic body is insert-molded to the bracket member formed of a resin material, and a manufacturing method of the vibration isolation device.

BACKGROUND ART

As an example of a vibration isolation device, one with a structure is known for example in which an insertion hole is arranged in a bracket member attached to the vehicle body side, an inner cylinder member insertingly arranged in the insertion hole is attached to the vibration source (an engine, motor, transmission and the like for example) side, and the inner periphery side of the insertion hole and the outer periphery side of the inner cylinder member are connected to each other by vibration isolation leg parts formed of a rubber-like elastic body.

In recent years, with the aims of reducing the weight and lowering the cost, it has been tried to form a bracket member of a resin material. For example, in Patent Literature 1, a technology is disclosed in which a bracket member is formed of a resin material, a metal plate is disposed on the inner peripheral surface of a mount attaching hole (insertion hole) arranged in the bracket member, and a main body rubber elastic body (vibration isolation leg part) is adhered to the metal plate, and thereby the main body rubber elastic body is fixed to the inner peripheral surface of the mount attaching hole.

According to the technology, because the metal plate is interposed between the main body rubber elastic body and the bracket member, even when a local concentrated load is applied by the main body rubber elastic body in inputting a large displacement, the concentrated load can be borne by the metal plate. Thus, the strength required for the bracket member can be made comparatively low, and enlargement for securing the strength of the bracket member can be suppressed correspondingly.

In the meantime, according to the conventional vibration isolation device described above, in addition to the technology that the metal plate is fixed to the bracket member by adhesion, a technology of fixing by mechanical engagement structure is also disclosed. According to the mechanical engagement structure, the production cost can be reduced by a degree an adhesive and its coating step can be made unnecessary.

CITATION LIST

Patent Literature

Patent Literature 1: Japanese Unexamined Patent Application Publication No. Hei 9-170634 (FIG. 1 to FIG. 5, paragraph [0007] and the like)

SUMMARY OF INVENTION

Technical Problem

However, according to the conventional vibration isolation device described above, there was a problem that the structure of the resin molding mold for molding the bracket member became complicated because a part of the inner peripheral surface of the insertion hole of the bracket member was configured to overhang toward the vibration isolation leg part in order to make the metal plate (external member) mechanically engage therewith and the overhanging section became of an under-cut shape.

Also, according to the conventional vibration isolation device described above, it was required to form the metal plate into a shape of continuing between one leg part to the other leg part in order that the engaged state of the metal plate and the bracket member was maintained and the metal plate did not come-off from the bracket member even when the inner cylinder member is displaced in any direction. Therefore there was a problem that the metal plate became large and the weight increased correspondingly.

The present invention has been developed to address the problems described above, and the first object is to provide a vibration isolation device that can reduce the weight in a structure in which external members to which vibration isolation leg parts are adhered are fixed by mechanical engagement with a bracket member formed of a resin material and can simplify the structure of a resin molding mold that molds the bracket member.

Also, with respect to the problems described above, as a result of intensive studies, the present applicant has found out that the structure of the resin molding mold could be simplified while suppressing the other end side of the vibration isolation leg part from coming-off from the bracket member by making an external member be embedded in the other end side of the vibration isolation leg part and insert-molding the other end side of the vibration isolation leg part along with such external member in the bracket member (not yet publicly known as of the time of present application).

An example of the structure of the vibration isolation device and the resin molding mold will be described referring to FIG. 26 and FIG. 27. FIG. 26 is a perspective view of a vibration isolation device 5200.

As shown in FIG. 26, the vibration isolation device 5200 mainly includes a bracket member 5230 formed of a resin material, an inner cylinder member 5240 insertingly arranged in an insertion hole 5231 formed in the bracket member 5230, a pair of vibration isolation leg parts 5250 with one end side being connected to the inner cylinder member 5240, with the other end side being insert-molded to the inner periphery side of the insertion hole 5231 of the bracket member 5230, and formed of a rubber-like elastic body, and a pair of external members 5260 embedded in the other end sides of the pair of vibration isolation leg parts 5250 (refer to FIG. 27). On the other end sides of the vibration isolation leg parts 5250, covering rubber parts 5253 covering the external members 5260 are formed. The covering rubber parts 5253 are portions functioning as stopper surfaces and are protruded from the outer surface of the bracket member 5230 toward the axial direction of the inner cylinder member 5240. That is, by abutment of counterpart parts on the covering rubber parts 5253, displacement of the covering rubber parts 5253 is restricted.

FIG. 27 is a cross-sectional view of a clamped resin molding mold 5400, and corresponds to a cross-sectional view taken along a line XXVII-XXVII of FIG. 26. The vibration isolation device 5200 is manufactured by clamping the resin molding mold 5400 arranged with the inner cylinder member 5240 and the vibration isolation leg parts 5250 in the axial direction of the inner cylinder member 5240 (the up-down direction in FIG. 27), thereafter pouring a resin material into a cavity C for solidification, and insert-molding the vibration isolation leg parts 5250 to the bracket member 5230. The resin molding mold 5400 separates the cavity C to which the resin material is poured and a space S where a stopper surface of the covering rubber part 5253 is stored by abutment of an abutting surface part 5400a on a vertical wall part 5253a that continues to the stopper surface of the covering rubber part 5253 (the upper side surface in FIG. 27).

In this case, when adhesion between the abutting surface part 5400a of the resin molding mold 5400 and the vertical wall 5253a of the covering rubber part 5253 is weak, the resin material poured into the cavity C encroaches between the abutting surface part 5400a and the vertical wall 5253a to become a bur. Because such bur is formed of a resin material and hard, the function of the covering rubber part 5253 as a stopper surface is impaired. Therefore, in order to secure the stopper function, generation of the bur should be suppressed, and high dimension accuracy is required for the abutting surface part 5400a of the resin molding mold 5400 and the vertical wall 5253a of the vibration isolation leg part 5250.

The present invention has been developed in consideration of the circumstance described above, and the second object is to provide a vibration isolation device that can secure a stopper function by the vibration isolation leg parts by suppressing generation of a bur in insert-molding in a structure in which the vibration isolation leg parts formed of a rubber-like elastic body are insert-molded to a bracket member formed of a resin material and a manufacturing method of the vibration isolation device.

Solution to Problems and Advantageous Effects of Invention

According to the vibration isolation device described in a first aspect, because one end side of the vibration isolation leg part is connected to the inner cylinder member inserted into the insertion hole of the bracket member and the other end side of the vibration isolation leg part is vulcanizingly adhered to the external member formed of a metal material so that the external member is engaged with the bracket material, the other end side of the vibration isolation leg part is connected to the inner periphery side of the insertion hole of the bracket member. Therefore, the inner cylinder member is supported so as to be displaceable with respect to the inner periphery side of the insertion hole of the bracket member through the vibration isolation leg parts and the external members.

In this case, with respect to the external member and the bracket member, a portion embedded in the bracket member is engaged with the bracket member. Accordingly, because the bracket member side is not required to overhang toward the vibration isolation leg part in order to engage with the external member and formation of an under-cut shape can be suppressed, there is an effect of allowing simplifying the structure of the resin molding mold that molds the bracket member correspondingly.

Also, according to the present invention, a pair of the external members respectively include a portion embedded in the bracket member, and can respectively maintain a state of being engaged with the bracket member. Therefore, as in the conventional products, it is not necessary to make the external member of a shape continuing from one leg part to the other leg part in order to maintain an engaged state of the outer plate and the bracket member and to prevent coming-off from the bracket member even when the inner cylinder member is displaced in any direction as is required. Accordingly, the section between the pair of the vibration isolation leg parts can be omitted, and therefore there is an effect of allowing to miniaturize the external member and to reduce the weight correspondingly.

According to the vibration isolation device described in a second aspect, in addition to the effect exerted by the vibration isolation device described the first aspect, the external member includes a plate-like base plate part to which the other end side of the vibration isolation leg part is vulcanizingly adhered and a plate-like extended wall part extended from an outer edge of the base plate part toward the bracket member and formed continuously in the peripheral direction, at least opposing two positions of the extended wall part are embedded in the bracket member so as to be engageable, and therefore movement of the external member in the vertical direction with respect to the inner peripheral surface of the insertion hole can be restricted. Also, because a part of the bracket member is internally fit to the inner periphery side of the extended wall part extended from the outer edge of the base plate part toward the bracket member and formed continuously in the peripheral direction, movement of the external member in the direction parallel to the inner peripheral surface of the insertion hole can be restricted. Thus, there is an effect that an engaged state of the external member and the bracket member can be maintained and such external member can be surely prevented from coming off from the bracket member even when the inner cylinder member is displaced in any direction.

Further, according to the present invention, because the external member is formed into a shape in which the plate-like extended wall part is extended from the outer edge of the plate-like base plate part toward one side (so-called container shape), the external member can be easily manufactured by subjecting one flat raw plate to drawing work by a press machine using a punch and a die. Accordingly, there is an effect that the manufacturing cost of the external member can be reduced and the manufacturing cost of total vibration isolation device can be reduced correspondingly.

Also, in this case, because the extended wall part is formed continuously in the peripheral direction, the strength in the bending direction thereof can be increased. Accordingly, there is an effect that because the plate thickness of the external member can be reduced correspondingly, the material cost can be reduced and the weight can be reduced.

According to the vibration isolation device described in a third aspect, in addition to the effect exerted by the vibration isolation device described the second aspect, the external member has an effect that, because a through hole is penetratingly formed in the base plate part, such base plate part can be prevented from being deformed in the manufacturing process of the vibration isolation device even when the base plate is formed into a plate shape. That is, when the vibration isolation leg part is to be vulcanizingly adhered to the base plate part inside the rubber vulcanizing mold, the vulcanizing pressure applied from the rubber-like elastic body poured into the rubber vulcanizing mold can be released by the through hole, whereas similarly, when the vibration isolation leg part vulcanizingly adhered to the external member is to be arranged inside the resin molding mold and the bracket member is to be insert-molded, the pouring pressure of the resin material poured into the resin molding mold can be released by the through hole, and therefore the external member can be prevented from being deformed.

Here, a part of the bracket member is to be insertingly fit to the inner periphery side of the extended wall part of the external member, however, when the through hole is penetratingly formed in the base plate part as in the present invention, in insert-molding the bracket member, the pouring pressure of the resin material poured into the resin molding mold can be applied to the vibration isolation leg part through the through hole. Thus, there is an effect that, because pre-compression can be imparted to the vibration isolation leg part, the durability thereof can be improved. Also, there is an effect that the spring characteristic of the vibration isolation leg part can be adjusted because the pre-compression amount can be changed by changing the pouring pressure of the resin material.

Also, according to the present invention, in insert-molding the bracket member, the resin material poured into the resin molding mold is pressed into the vibration isolation leg part side through the through hole, and therefore such resin material becomes an internally fit state of being fit to the vibration isolation leg part while penetrating the through hole. Accordingly, there is an effect that the external member can be surely prevented from coming-off from the bracket member due to such internally fit state.

According to the vibration isolation device described in a fourth aspect, in addition to the effect exerted by the vibration isolation device described in the first and second aspect, the extended wall part of the external member includes a pair of first wall parts disposed so as to oppose to each other with at least a part thereof respectively embedded in the bracket member and a pair of second wall parts connecting ends of the first wall parts to each other, disposed so as to oppose to each other embracing the bracket member and formed into a flat plate shape, the covering rubber parts covering the second wall parts are protruded from the outer surfaces of the bracket member, and therefore there is an effect that such covering rubber parts can be utilized as stopper parts that abut on counterpart parts and restrict the displacement thereof.

In this case, because the pair of second wall parts formed into a flat plate shape is embedded in the covering rubber parts, the impact force generated when the counterpart parts abut thereon can be received by the second wall parts and the load of the bracket member can be reduced. Thus, there is an effect that, even when the bracket member is formed of a resin material, the durability thereof can be improved. Also, there is an effect that, because the second wall parts are connected to the ends of the first wall parts, the strength in the bending direction can be improved correspondingly, and the durability of the second wall parts that receive the impact force generated when the counterpart parts abut thereon can be improved. Further, there is an effect that, by increasing the strength of the second wall parts utilizing the first wall parts, the plate thickness of the external members can be reduced correspondingly, therefore the material cost can be reduced, and the weight can be reduced.

Also, because the covering rubber part is formed of a rubber-like elastic body that continues to the vibration isolation leg part, there is an effect that the vibration isolation leg part and the covering rubber part can be vulcanizingly molded simultaneously, and the manufacturing cost can be reduced correspondingly. Further, because the entire external member can be covered with the rubber-like elastic body by forming the covering rubber part from the rubber-like elastic body that continues to the vibration isolation leg part, there is an effect that the corrosion resistance of the external member can be improved.

According to the vibration isolation device described in a fifth aspect, in addition to the effect exerted by the vibration isolation device described in the fourth aspect, the covering rubber part covering the second wall part and protruded from the outer surface of the bracket member includes a seal surface part of a flat surface shape positioned on the outer edge side and a stopper surface part arranged so as to continue to the seal surface part through a step and protruded from the seal surface part by the amount of the step, and is insert-molded on the inner periphery side of the insertion hole of the bracket member in a state the pressing surface part of the resin molding mold presses the seal surface part and separates the cavity to which the resin material is poured and the space where the stopper surface is stored, and therefore there is an effect that generation of a bur in the manufacturing process of the vibration isolation device can be suppressed and the stopper function can be secured.

That is, because the seal surface part in the covering rubber part covering the second wall part is formed into a flat surface shape and the pressing surface part of the resin molding mold presses such seal surface part, these pressing surface part and seal surface part can be securely adhered to each other. Accordingly, there is an effect that the resin material poured into the cavity is stopped from encroaching between the pressing surface part and the seal surface part, and generation of the bur in insert-molding is suppressed correspondingly.

Also, when adherence of the pressing surface part and the seal surface part to each other can be made secure in this way, there is an effect that the dimensional accuracy of the pressing surface part of the resin molding mold and the seal surface part of a rubber part covering the second wall part can be made loose correspondingly, and therefore the manufacturing cost of the resin molding mold and the rubber vulcanizing mold for manufacturing the vibration isolation device can be reduced.

Further, because the stopper surface part of the covering rubber part covering the second wall part is arranged so as to continue to the seal surface part through the step and protruded from the seal surface part by the amount of the step, even when the resin material poured into the cavity encroaches between the pressing surface part and the seal surface part and the resin material that has encroached becomes a bur, the stopper surface of the stopper surface part can be made to be apart from the bur by the amount of the step. Accordingly, there is an effect that, even when the bur is generated in the manufacturing process of the vibration isolation device, the stopper function by the stopper surface part can be secured.

According to the vibration isolation device described in a sixth aspect, a protrusion rubber part protruded from the outer surface of the bracket member includes a seal surface part of a flat surface shape positioned on the outer edge side and a stopper surface part arranged so as to continue to the seal surface part through a step and protruded from the seal surface part by the amount of the step, and is insert-molded on the inner periphery side of the insertion hole of the bracket member in a state the pressing surface part of the resin molding mold presses the seal surface part in the protrusion rubber part and separates the cavity to which the resin material is poured and the space where the stopper surface of the protrusion rubber part is stored, and therefore there is an effect that generation of a bur in the manufacturing process of the vibration isolation device can be suppressed and the stopper function can be secured.

That is, because the seal surface part in the protrusion rubber part is formed into a flat surface shape and the pressing surface part of the resin molding mold presses such seal surface part, these pressing surface part and seal surface part can be securely adhered to each other. Accordingly, there is an effect that the resin material poured into the cavity is stopped from encroaching between the pressing surface part and the seal surface part, and generation of a bur in insert-molding is suppressed correspondingly.

Also, when adherence of the pressing surface part and the seal surface part to each other can be made secure in this way, there is an effect that the dimensional accuracy of the pressing surface part of the resin molding mold and the seal surface part of the protrusion rubber part can be made loose correspondingly, and therefore the manufacturing cost of the resin molding mold and the rubber vulcanizing mold for manufacturing the vibration isolation device can be reduced.

Further, because the stopper surface part of the protrusion rubber part is arranged so as to continue to the seal surface part through the step and protruded from the seal surface part by the amount of the step, even when the resin material poured into the cavity encroaches between the pressing surface part and the seal surface part and the resin material that has encroached becomes a bur, the stopper surface of the stopper surface part can be made to be apart from the bur by the amount of the step. Accordingly, there is an effect that, even when the bur is generated in the manufacturing process of the vibration isolation device, the stopper function by the stopper surface part can be secured.

According to the manufacturing method of a vibration isolation device described in a seventh aspect, a first molded body obtained by vulcanizingly adhering one end side of a pair of vibration isolation leg parts to the inner cylinder member is molded in the rubber vulcanizing step by arranging the inner cylinder member and the external members inside the cavity of the rubber vulcanizing mold, thereafter pouring the rubber-like elastic body into the cavity and for vulcanizingly molding. Next, in the resin molding step, the first molded body molded in the rubber vulcanizing step is arranged inside the cavity of the resin molding mold, a resin material is poured into the cavity to be solidified, and thereby the first molded body is insert-molded to the bracket member.

In this case, the first molded body molded in the rubber vulcanizing step has effects that generation of a bur can be suppressed and the stopper function can be secured because the protrusion rubber part includes a seal surface part of a flat surface shape positioned on the outer edge side and a stopper surface part arranged so as to continue to the seal surface part through a step and protruded from the seal surface part by the amount of the step, and, in the resin molding step, the pressing surface part of the resin molding mold separates the cavity to which the resin material is poured and the space where the stopper surface in the protrusion rubber part of the first molded body is stored by pressing the seal surface part in the protrusion rubber part of the first molded body.

That is, because the seal surface part in the protrusion rubber part is formed into a flat surface shape and the pressing surface part of the resin molding mold presses such seal surface part, these pressing surface part and seal surface part can be securely adhered to each other. Accordingly, there is an effect that the resin material poured into the cavity is stopped from encroaching between the pressing surface part and the seal surface part and generation of a bur in insert-molding can be suppressed correspondingly.

Also, when the pressing surface part and the seal surface part can be securely adhered to each other in this way, the dimensional accuracy of the pressing surface part of the resin molding mold and the seal surface part in the protrusion rubber part of the first molded body can be made loose, and therefore there is an effect that the manufacturing cost of the resin molding mold and the rubber vulcanizing mold can be reduced.

Further, because the stopper surface part of the protrusion rubber part is arranged so as to continue to the seal surface part through the step and protruded from the seal surface part by the amount of the step, even when the resin material poured into the cavity encroaches between the pressing surface part and the seal surface part and the resin material that has encroached becomes a bur, the stopper surface of the stopper surface part can be made to be apart from the bur by the amount of the step. Accordingly, there is an effect that, even when the bur is generated, the stroke (allowance for compression) of the stopper surface part is secured and the stopper function thereof can be secured.

According to the manufacturing method of a vibration isolation device described in an eighth aspect, in addition to the effect exerted by the manufacturing method of a vibration isolation device described in the seventh aspct, the rubber vulcanizing step includes pouring a rubber-like elastic body into a cavity of a rubber vulcanizing mold in which the external members are arranged along with the inner cylinder member for vulcanizingly molding, molding a first molded body in which one end sides of a pair of vibration isolation leg parts are connected to the outer peripheral surface of the inner cylinder member and the external members are embedded on the other end sides of the pair of vibration isolation leg parts, in the resin molding step, the pressing surface part of the resin molding mold presses a range that is the seal surface part of the protrusion rubber part and overlaps with at least a part of the external member, and therefore the seal surface part pressed by the pressing surface part can be supported by the external member formed of a metal material from the rear surface side thereof. Thus, because adhesion of the pressing surface part and seal surface part to each other can be made more secure, there are effects that the resin material poured into the cavity can be suppressed from encroaching between the pressing surface part and the seal surface part, and generation of a bur in insert-molding can be more securely suppressed correspondingly.

Also, according to the eighth aspect, in the rubber vulcanizing step, because the external members formed of a metal material are embedded on the other end sides of the vibration isolation leg parts and the other end sides of the vibration isolation leg parts are insert-molded to the bracket member in the resin molding step, at least a part of the external member is engaged with the bracket member, and therefore there is an effect that a vibration isolation device that can stop the other end sides of the vibration isolation leg parts from coming out from the bracket member can be manufactured.

According to the manufacturing method of a vibration isolation device described in a ninth aspect, in addition to the effects exerted by the manufacturing method of a vibration isolation device described in the seventh or eighth aspects, because the resin molding mold used in the resin molding step has a predetermined gap between the vertical wall that continues to the pressing surface part and the step between the seal surface part and the stopper surface part of the first molded body, pads of the rubber-like elastic body pushed out because the seal surface part is pressed by the pressing surface part can be released to the gap between the vertical wall and the step to be absorbed. By releasing the pads in this way, there is an effect that the pressing surface part and the seal surface part can be securely adhered to each other without being impaired by the pads. As a result, because the resin material poured into the cavity can be stopped from encroaching between the pressing surface part and the seal surface part, generation of a bur in insert-molding can be more securely suppressed correspondingly.

BRIEF DESCRIPTION OF DRAWINGS

FIG. 1 is a perspective view of the vibration isolation device in the first embodiment of the present invention.

FIG. 3(a) is a perspective view of an external member, and FIG. 3(b) is a rear view of the external member.

FIG. 4(a) is a cross-sectional view of the external member taken along a line IVa-IVa of FIG. 3(b), and FIG. 4(b) is a cross-sectional view of the external member taken along a line IVb-IVb of FIG. 3(b).

FIG. 15(a) is a front view of the vibration isolation device, and FIG. 15(b) is a side view of the vibration isolation device.

FIG. 24 is a partial cross-sectional view of the vibration isolation device.

DESCRIPTION OF EMBODIMENTS

Figure 2B:
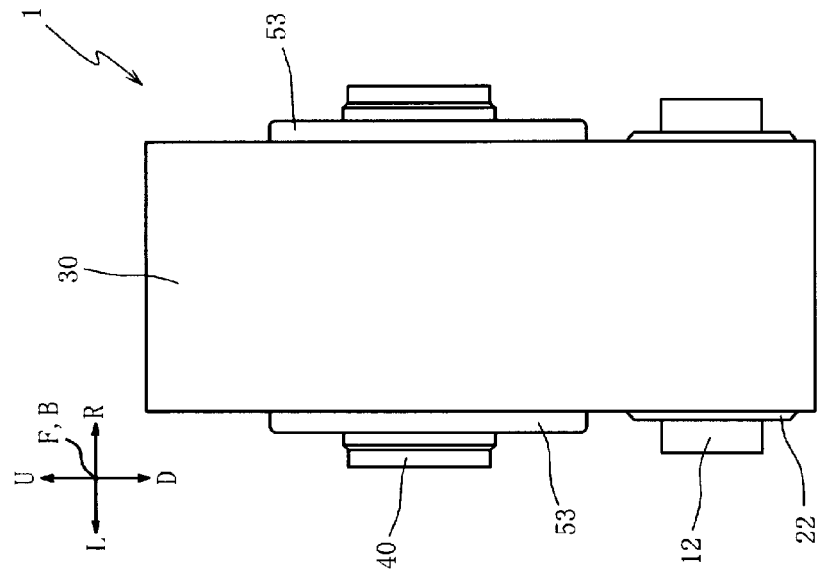
FIG. 2(b) is a side view of the vibration isolation device.
Figure 2A:
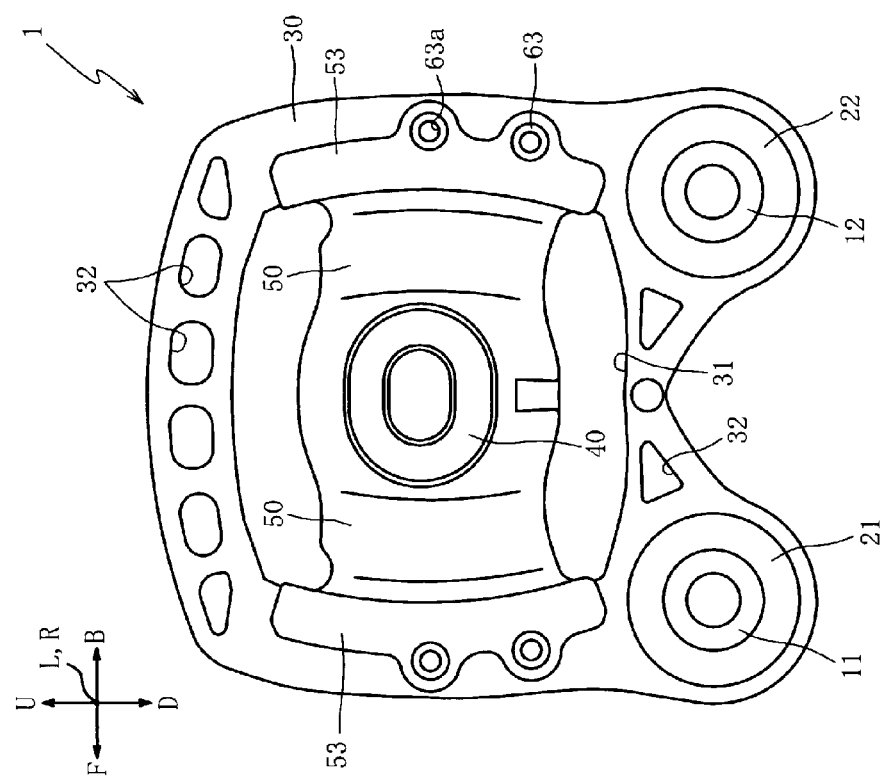
FIG. 2(a) is a front view of the vibration isolation device.

Below, embodiments of the present invention will be described referring to attached drawings. First, the total constitution of a vibration isolation device 1 will be described referring to FIG. 1 and FIG. 2. FIG. 1 is a perspective view of the vibration isolation device 1 in the first embodiment of the present invention, FIG. 2(a) is a front view of the vibration isolation device 1, and FIG. 2(b) is a side view of the vibration isolation device 1. Also, in FIG. 1 and FIG. 2, the directions of arrows F, B show the vehicle front and back directions, the directions of arrows L, R show the vehicle right and left directions, and the directions of arrows U, D show the vehicle up and down directions respectively.

Figure 7A:
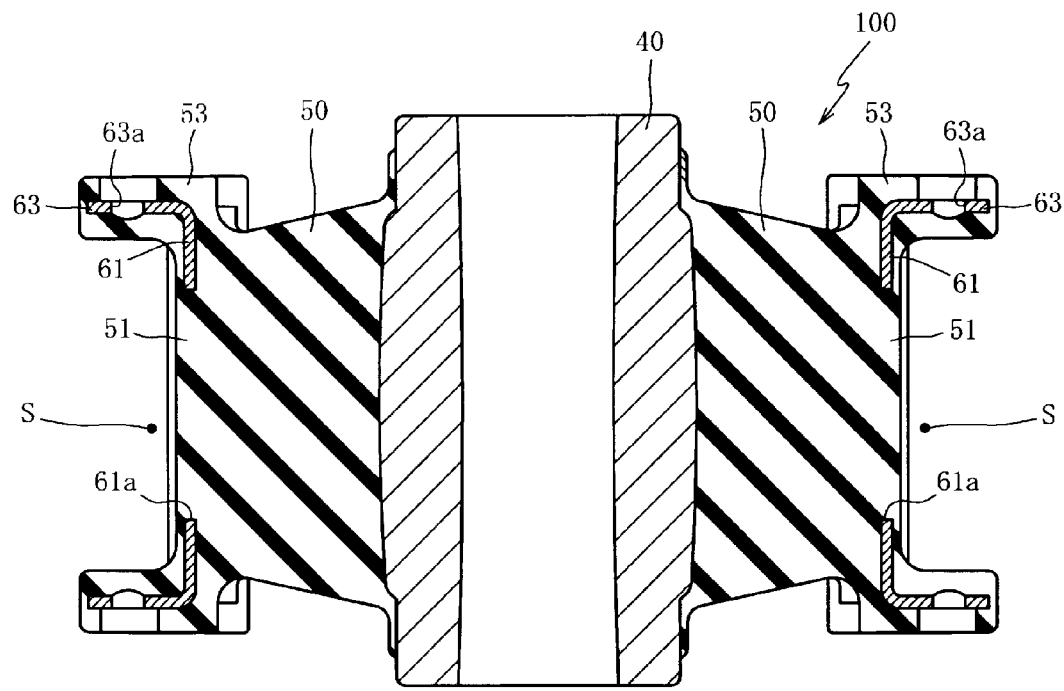
FIG. 7(a) is a cross-sectional view of the first molded body taken along a line VIIa-VIIa of FIG. 6(a)
Figure 7B:
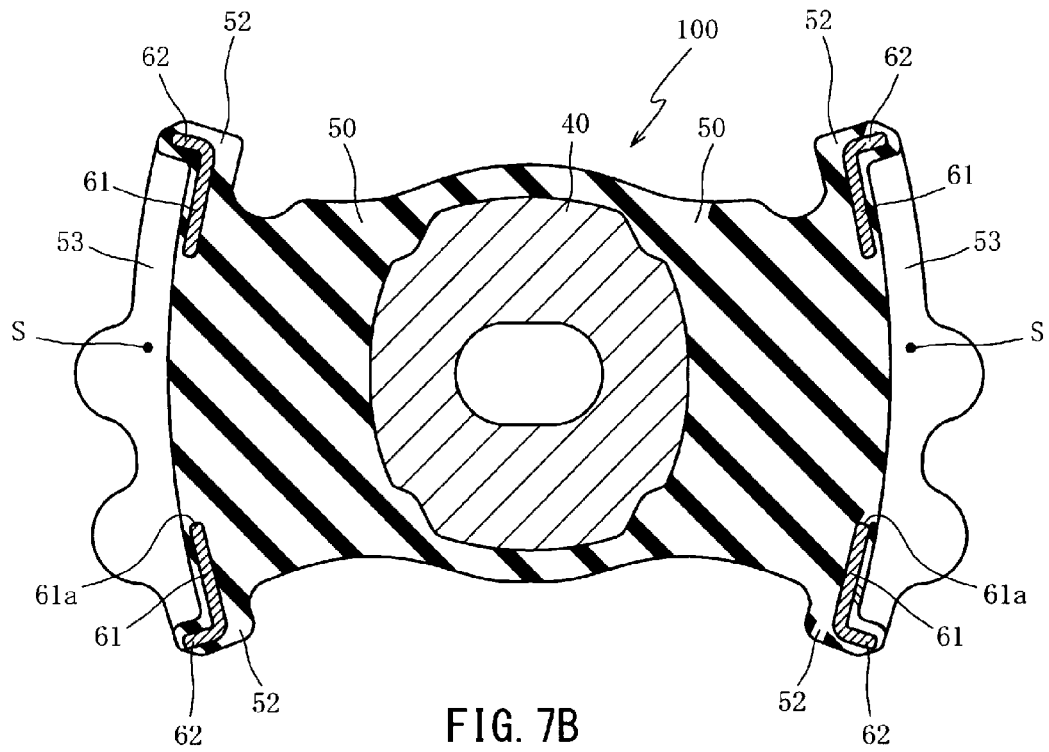
FIG. 7(b) is a cross-sectional view of the first molded body taken along a line VIIb-VIIb of FIG. 6(b).

As shown in FIG. 1 and FIG. 2, the vibration isolation device 1 is one to prevent the vibration generated from a vibration source (not shown) of an automobile from being transmitted to a vehicle body (not shown) while supportingly fixing the vibration source, and is constituted to mainly include a short-axis attachment implement 11 and a long-axis attachment implement 12 of a cylindrical shape attached on the vehicle body side, elastic bodies 21, 22 vulcanizingly adhered to the outer peripheral surfaces of both of the attachment implements 11, 12 and formed of a rubber-like elastic body, a bracket member 30 having press-fitting holes into which both of the elastic bodies 21, 22 are press-fit respectively and formed of a resin material, an inner cylinder member 40 insertingly arranged in an insertion hole 31 formed in the bracket member 30 and attached on the vibration source side, a pair of vibration isolation leg parts 50 whose one end sides are connected to the inner cylinder member 40 and formed of a rubber-like elastic body, and a pair of external members 60 (refer to FIG. 7) to which the other end sides of the pair of vibration isolation leg parts 50 are connected respectively and which are engaged with the bracket member 30.

Also, the vibration source is a motor in the present embodiment; however an engine, transmission and the like are exemplified instead.

The short-axis attachment implement 11 and the long-axis attachment implement 12 are formed of an iron and steel material, and are implements attached on the vehicle body side. Both of the attachment implements 11, 12 are formed into a cylindrical shape having a through hole, bolts (not shown) are inserted into the through holes, and the end faces of both of the attachment implements 11, 12 are attached to the vehicle body side respectively by fastening the bolts.

The bracket member 30 is constituted of a resin material as a frame-shape body of a generally rectangular shape in a front view, and the press-fitting holes and an insertion hole 31 are formed so as to penetrate in the thickness direction. The respective attachment implements 11, 12 with the elastic bodies 21, 22 vulcanizingly adhered on the outer peripheral surface thereof are press-fit to and held by the press-fitting holes. The inner cylinder member 40 is inserted into the insertion hole 31. Further, the inner peripheral surface of the insertion hole 31 also acts as a stopper part that receives the inner cylinder member 40 and restricts the displacement thereof when a large displacement is inputted.

At the upper and lower ends of the bracket member 30, multiple lightening holes 32 are formed so as to extend through in the thickness direction. Also, the press-fitting holes, the insertion hole 31 and the lightening holes 32 have a tapered inner periphery whose inside diameter increases toward the opening side and are formed parallel to the axial direction of the inner cylinder member 40 and holes 63a of the external members 60 described below. Accordingly, demolding property from a resin molding mold 400 (refer to FIG. 10) is secured.

The inner cylinder member 40 is formed of an aluminum alloy into a cylindrical shape with an elliptical cross section having a through hole. The inner cylinder member 40 is fasteningly fixed to the vibration source side through a bolt (not shown) that is inserted into the through hole. The pair of vibration isolation leg parts 50 are formed of a rubber-like elastic body, and are members for stopping vibration generated on the vibration source side from being transmitted to the vehicle body side with one end sides thereof being respectively connected to the outer peripheral surface of inner cylinder member 40 and with the other end sides thereof being respectively connected to the inner peripheral surface of the insertion hole 31 in the bracket member 30.

The pair of vibration isolation leg parts 50 are connected to the inner peripheral surfaces that are in the vehicle front-back direction of the insertion hole 31, and spaces are formed in a gap against the upper side (vehicle upper side) and a gap against the lower side (vehicle lower side) of the insertion hole 31. Accordingly, the spring constant of the vibration isolation leg part 50 in the up-down direction when the inner cylinder member 40 is displaced in the vehicle up and down direction is made smaller than the spring constant in the right-left direction when the inner cylinder member 40 is displaced in the vehicle right and left direction.

Next, the external member 60 will be described referring to FIG. 3 and FIG. 4. FIG. 3(*a*) is a perspective view of the external member 60, and FIG. 3(*b*) is a rear view of the external member 60. FIG. 4(*a*) is a cross-sectional view of the external member 60 taken along a line IVa-IVa of FIG. 3(*b*), and FIG. 4(*b*) is a cross-sectional view of the external member 60 taken along a line IVb-IVb of FIG. 3(*b*).

As shown in FIG. 3 and FIG. 4, the external members 60 are members formed into a container shape by subjecting one plate-like body formed of a metal material to drawing work by a press machine, are embedded in the other end sides of the pair of vibration isolation leg parts 50 respectively, and are engaged with the bracket member 30. The external member 60 includes a base plate part 61 formed into a rectangular shape in a rear view, a pair of first wall parts 62 extended from two sides (the upper side and the lower side in FIG. 3(*b*)) that are the outer edges of the base plate part 61 and oppose to each other toward the rear surface side (the front side of the paper in FIG. 3(*b*)), and a pair of second wall parts 63 extended from remaining two sides of the base plate part 61 toward the rear surface side and connecting the ends of the pair of first wall parts 62 to each other.

The base plate part 61 is formed so as to curve into an arc shape being convex toward the rear surface side and having an axis L1 (refer to FIG. 4(*a*)). That is, the base plate part 61 is formed into a shape obtained by cutting a part of a cylindrical side wall whose axis L1 extends in the perpendicular direction of the paper in FIG. 4(*a*). In the center of the plate face of the base plate part 61, a through hole 61*a* of generally rectangular shape in a rear view is bored.

The through hole 61*a* is disposed in the center of the pair of second wall parts 63 that oppose to each other, but is disposed deviating to one side (the lower side in FIG. 3(*b*) and FIG. 4(*a*)) from the center of the pair of first wall parts 62 opposing to each other. Accordingly, in FIG. 4(*a*), the central angle θa of an arc formed by the base plate part 61 on the upper side of the through hole 61*a* is made larger than the central angle θb of an arc formed by the base plate part 61 on the lower side of the through hole 61*a*.

The first wall part 62 is a portion of a flat plate shape for mainly restricting movement of the external member 60 in the vehicle front and back directions (the directions of the arrows F, B) and the vehicle up and down directions (the arrows U, D) with respect to the bracket member 30 (refer to FIG. 12), and is formed into a tapered shape with one pair thereof disposed so as to oppose to each other and with the opposing distance of the pair increasing as becoming apart from the rear surface side of the base plate part 61 (refer to FIG. 4(*a*)). Also, the pair of first wall parts 62 are formed into a shape same to each other.

The second wall part 63 is a portion of a flat plate shape for mainly restricting movement of the external member 60 in the vehicle right and left directions (the directions of the arrows R, L) (refer to FIG. 10) with respect to the bracket member 30 with a pair being arranged so as to oppose to each other while maintaining a mutually parallel state (refer to FIG. 4(*b*)). In the pair of second wall parts 63, the holes 63*a* of a circular shape in a front view are bored in four locations in total, two locations for each second wall part 63.

As shown in FIG. 4(*a*), the respective holes 63*a* are arranged in a position deviated to one first wall part 62 side (the lower side in FIG. 4(*a*)) out of the pair of first wall parts 62. More specifically, one hole 63*a* out of the holes 63*a* that are bored in two locations is arranged generally in the center of the pair of first wall parts 62 and the other hole 63*a* is arranged on one first wall part 62 side out of the pair of first wall parts 62 respectively.

In the second wall part 63, swelled out parts of a semicircle shape in a front view are formed so as to swell out from the outer edges, and the respective holes 63*a* are arranged in positions concentric to the swelled out parts. Also, because both the swelled out parts and the through hole 61*a* are arranged so as to deviate to one side from the center of the pair of first wall parts 62 that oppose to each other as described above, drop of the strength due to the through hole 61*a* can be compensated by the swelled out part, and therefore the strength of the total external member 60 can be improved.

Here, the pair of second wall parts 63 are formed into a shape identical to each other including the layout of the holes 63*a*. Accordingly, the external member 60 can be used commonly for both of the right and left sides of the vibration isolation device 1 (the first molded body 100) (refer to FIG. 7).

Figure 5:
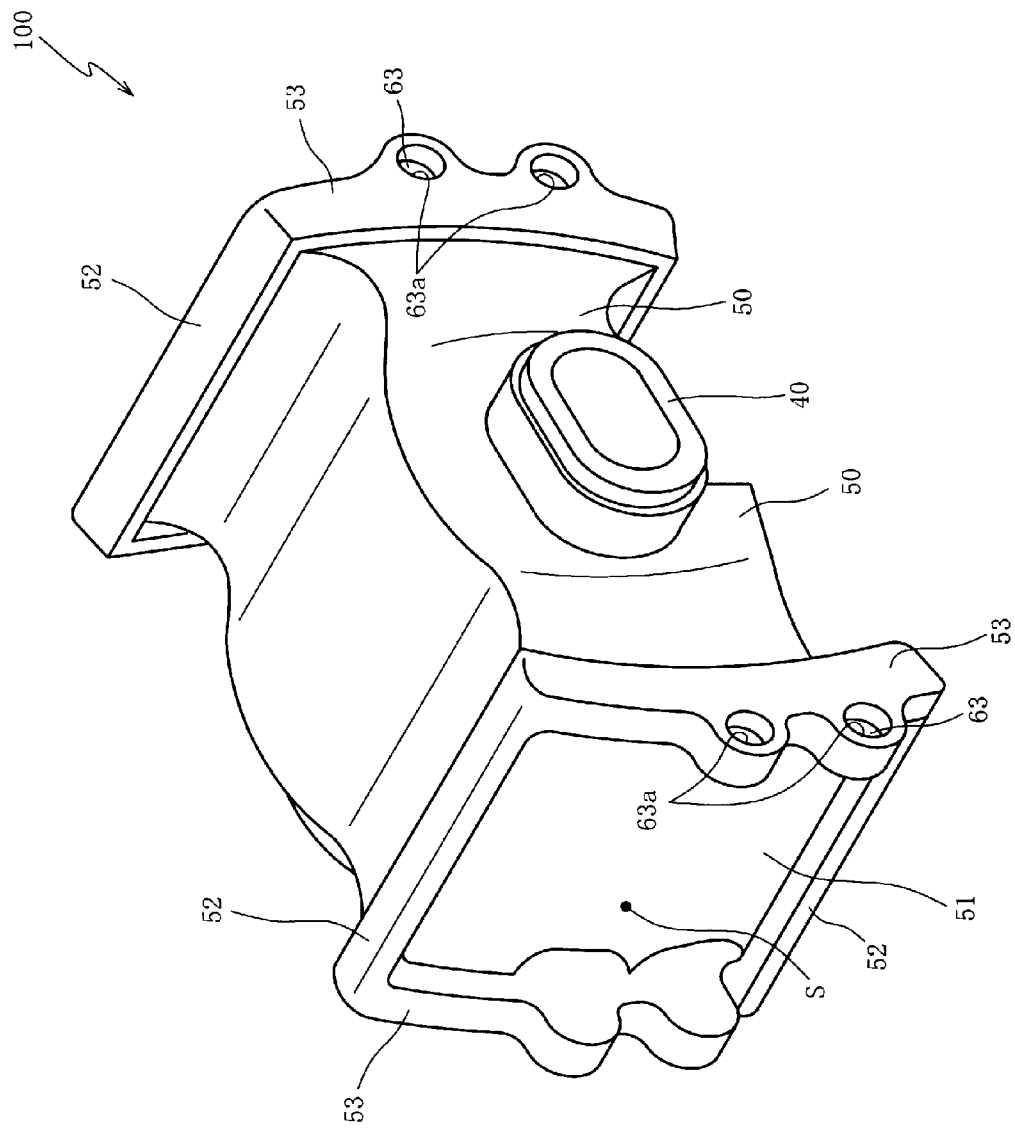
FIG. 5 is a perspective view of the first molded body.
Figure 6B:
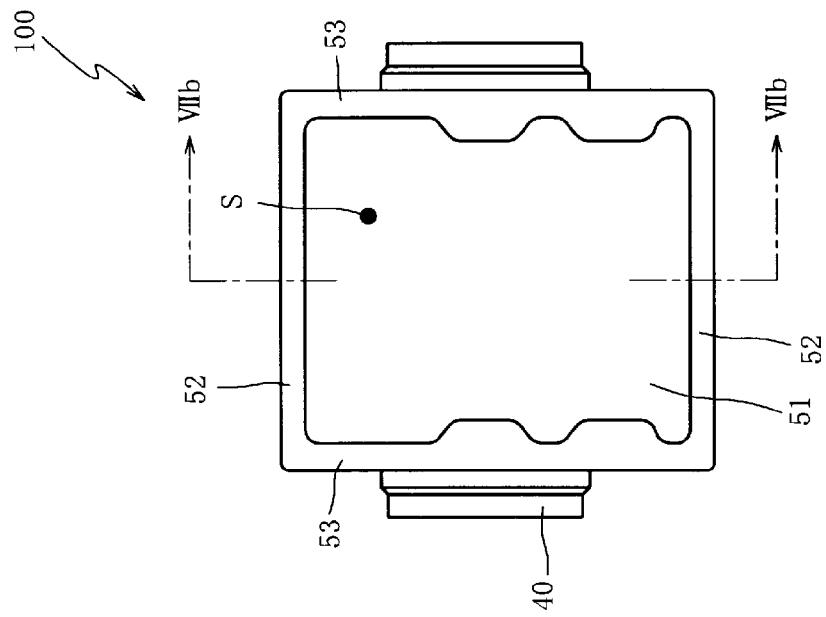
FIG. 6(b) is a side view of the first molded body.
Figure 8:
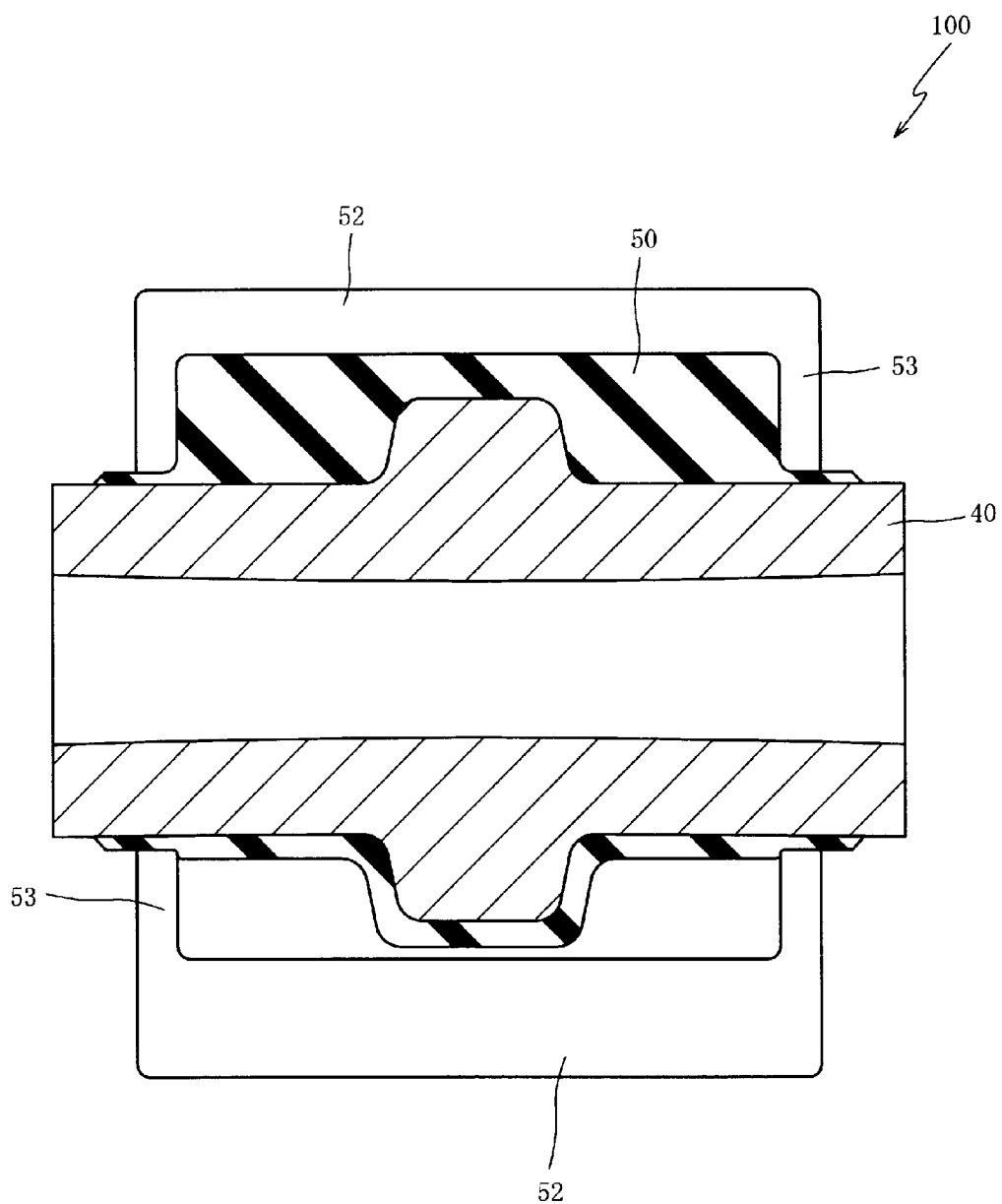
FIG. 8 is a cross-sectional view of the first molded body taken along a line VIII-VIII of FIG. 6(a).

Next, the first molded body 100 will be described referring to FIG. 5 to FIG. 8. FIG. 5 is a perspective view of the first molded body 100. FIG. 6(*a*) is a front view of the first molded body 100, and FIG. 6(*b*) is a side view of the first molded body 100. Also, FIG. 7(*a*) is a cross-sectional view of the first molded body 100 taken along a line VIIa-VIIa of FIG. 6(*a*), FIG. 7(*b*) is a cross-sectional view of the first molded body 100 taken along a line VIIb-VIIb of FIG. 6(*b*), and FIG. 8 is a cross-sectional view of the first molded body 100 taken along a line VIII-VIII of FIG. 6(*a*).

As shown in FIG. 5 to FIG. 8, the first molded body 100 is a primary working product in a process for manufacturing the vibration isolation device 1 (the vulcanizing step using a rubber vulcanizing mold 300), mainly includes the inner cylinder member 40, the pair of vibration isolation leg parts 50 whose one end sides are connected to the inner cylinder member 40, the pair of external members 60 to which the other end sides of the pair of vibration isolation leg parts 50 are connected respectively, and respective covering rubbers 51 to 53 that cover the external members 60, and are formed symmetrically in the right and left (the right and left in FIG. 6(*a*)).

As shown in FIG. 5 to FIG. 8, the upper side and the lower side of the inner cylinder member 40 are covered with a rubber-like elastic body because one end sides of the pair of vibration isolation leg parts 50 continue to each other, and when a large displacement is inputted in the vehicle up and down directions (the directions of arrows U, D), the inner cylinder member 40 is abutted on the inner peripheral surface of the insertion hole 31 through the rubber-like elastic body (refer to FIG. 1).

The pair of external members 60 are arranged so as to oppose to each other at a predetermined interval with the rear surfaces thereof facing to each other, and the inner cylinder member 40 is arranged in between. Also, the pair of external members 60 are arranged is a state the axis L1 of the base plate part 61 thereof (refer to FIG. 4(a)) is parallel to the axis of the inner cylinder member 40.

The pair of vibration isolation leg parts 50 connect the inner cylinder member 40 and the pair of external members 60 respectively, and are formed into a shape extending linearly in the right-left direction in a front view. The respective covering rubbers 51 to 53 covering the outer surface of the external members 60 continue to the vibration isolation leg parts 50.

The base plate covering rubber 51 covers the outer surface of the base plate part 61 with a constant thickness dimension while being filled inside the through hole 61a. The thickness dimension of the base plate covering rubber 51 that covers the front surface side (the side the first and second wall parts 62, 63 are extended) of the base plate part 61 is made sufficiently thin, and is made smaller than the thickness dimension of the base plate part 61 in the present embodiment. Accordingly, as described below, in the resin molding step, when a resin material is filled in a space S, the resin material is fit into the through hole 61a by the injection pressure thereof.

The first wall covering rubbers 52 cover the outer surfaces of the pair of first wall parts 62 with a constant thickness dimension respectively, and the second wall covering rubbers 53 cover the outer surfaces of the pair of second wall parts 63 with a constant thickness dimension respectively. Also, into the holes 63a of the second wall parts 63, a rubber lower mold pin 301b and a rubber upper mold pin 302b of the rubber vulcanizing mold 300 are inserted, and therefore the second wall covering rubber 53 is not filled. Similarly, because rubber mold seat parts 301c, 302c of the rubber vulcanizing mold 300 abut on the outer surfaces of the second wall part 63 (the surfaces on the side opposite to the opposing surface), recesses of a shape corresponding to the rubber mold seat parts 301c, 302c are formed in the second wall covering rubber 53. Also, in the second wall covering rubbers 53 that cover the opposing surface side of the second wall parts 63, the thickness dimension is made thick only in portions corresponding to the holes 63a.

Because respective covering rubbers 51 to 53 cover the outer surfaces of the external member 60 with a predetermined thickness dimension as described above, the space S is formed between the opposing surfaces of the first wall parts 62 and the second wall parts 63 of the external member 60 (that is the portion surrounded by the base plate part 61, the first wall parts 62 and the second wall parts 63). To such space S, a part of the bracket member 30 is internally fit as described below.

Figure 9:
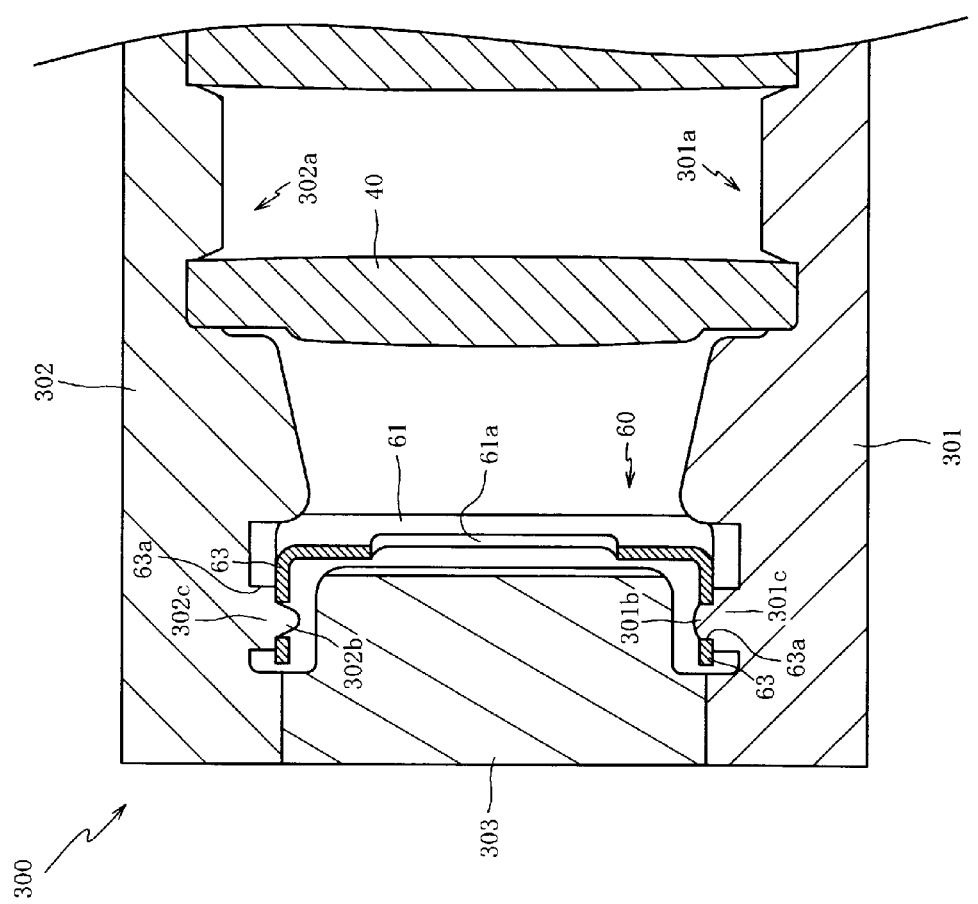
FIG. 9 is a cross-sectional view of the rubber vulcanizing mold set with the inner cylinder member and the external members and clamped.
Figure 10:
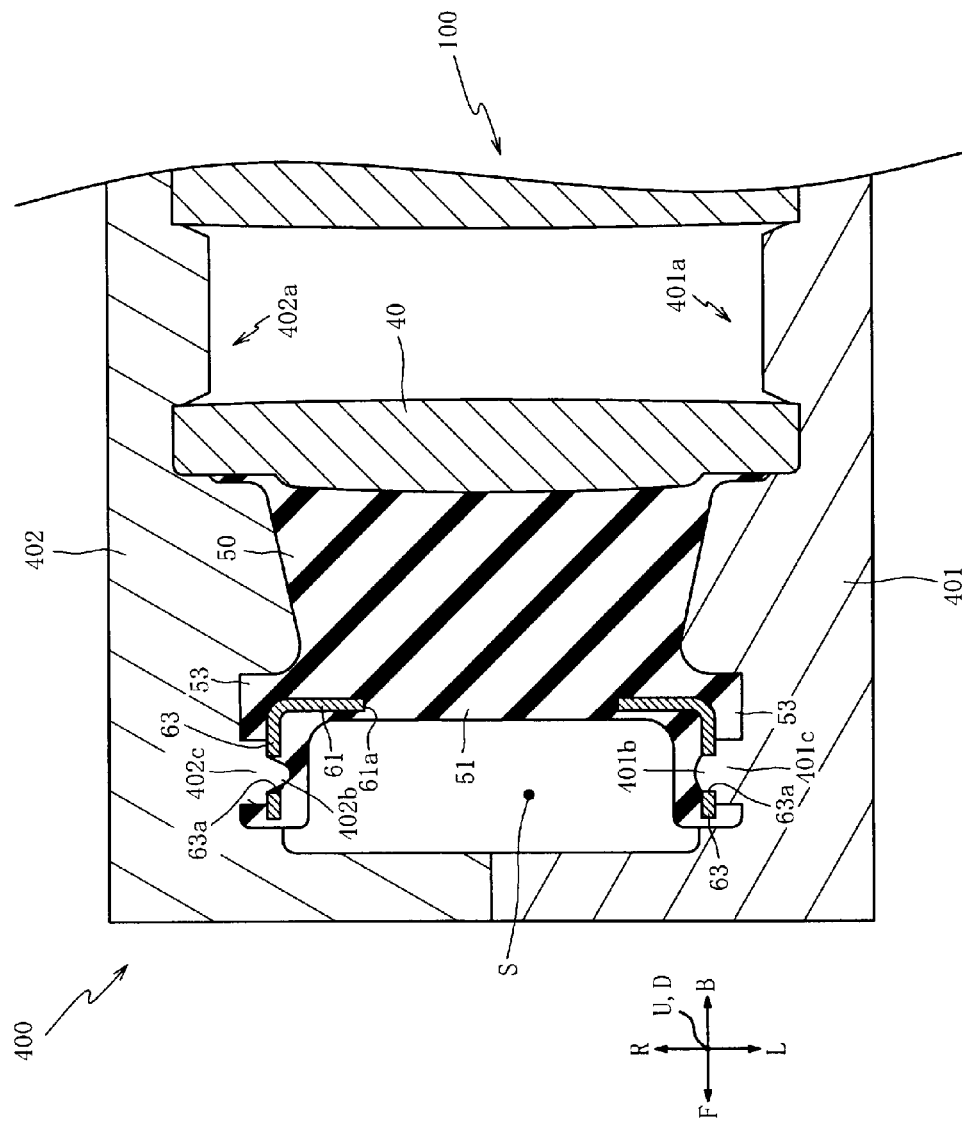
FIG. 10 is a cross-sectional view of the resin molding mold set with the first molded body and clamped.

Next, the manufacturing method of a vibration isolation device 1 will be described referring to FIG. 9 and FIG. 10. FIG. 9 is a cross-sectional view of the rubber vulcanizing mold 300 set with the inner cylinder member 40 and the external members 60 and clamped, and illustrates a state before the rubber-like elastic body is poured into the cavity. Also, FIG. 10 is a cross-sectional view of the resin molding mold 400 set with the first molded body 100 and clamped, and illustrates a state before the resin material is poured into the cavity. Further, the cross sections in FIG. 9 and FIG. 10 correspond to the cross section shown in FIG. 7(a).

As shown in FIG. 9, the rubber vulcanizing mold 300 is a mold for vulcanizingly molding the first molded body 100, includes a lower mold 301 and an upper mold 302 clamped vertically (the up-down direction in FIG. 9; the axial direction of the inner cylinder member 40) and a middle mold 303 embraced between the upper and lower molds 301, 302, and molds the first molded body 100 (refer to FIG. 5) by vulcanizing the rubber-like elastic body poured from a pouring hole (not shown) into the cavity formed by clamping and filled in the rubber vulcanizing step.

Figure 6A:
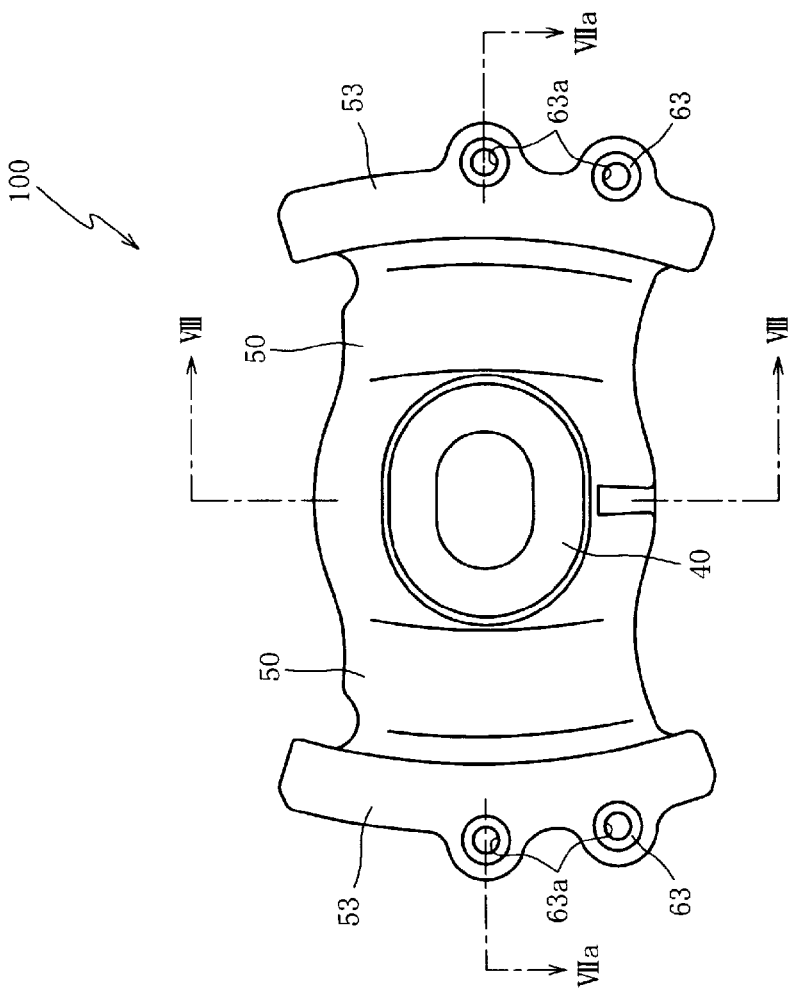
FIG. 6(a) is a front view of the first molded body.

The lower mold 301 is a portion for forming the outline on the front surface side (the front side of the paper in FIG. 6(a)) of the first molded body 100, and includes an inner cylinder locking part 301a for locking the inner cylinder member 40 and the rubber lower mold pin 301b and the rubber lower mold seat part 301c for locking the external member 60.

The inner cylinder locking part 301a is a portion locking the lower end of the inner cylinder member 40, and includes a recessed groove part recessed so that the lower end of the inner cylinder member 40 can be internally fit thereto and an insertion pin inserted from an opening at the lower end of the inner cylinder member 40.

The rubber lower mold pins 301b are cylindrical pins inserted into the holes 63a of the external member 60, and is formed in four locations in total, two locations each for one side. Because these respective rubber lower mold pins 301b are inserted into the respective holes 63a, the external member 60 is positioned at a predetermined position.

The rubber lower mold seat part 301c is a portion that supports the outer surface of the second wall part 63 of the external member 60, is formed into a cylindrical shape with a diameter larger than that of the rubber lower mold pin 301b, and is formed so as to be concentric with the rubber lower mold pin 301b. Accordingly, the rubber mold seat part 301c includes a step surface of a flat surface shape against the rubber lower mold pin 301b, and the step surface is made a ring-like seat surface that abuts on and supports the outer surface of the second wall part 63. Also, such seat surface is set so that the diameter thereof is smaller than that of the swelled out part of a semicircle shape formed in the second wall part 63, and is formed so as to fall within the outer surface of the second wall part 63.

The upper mold 302 is a section for forming the outline of the back surface side of the first molded body 100 (the back side of the paper in FIG. 6(a)), is constituted so as to be capable of clamping and unclamping by vertically moving with respect to the lower mold 301 (moving in the up-down direction in FIG. 9), and includes an inner cylinder locking part 302a for locking the inner cylinder member 40, and the rubber upper mold pin 302b and the rubber upper mold seat part 302c for locking the external member 60.

Also, because the inner cylinder locking part 302a, the rubber upper mold pin 302b and the rubber upper mold seat part 302c have the same constitutions with those of the inner cylinder locking part 301a, the rubber lower mold pin 301b and the rubber lower mold seat part 301c in the lower mold 301, description thereon will be omitted. However, the rubber upper mold pin 302b is made so that the maximum diameter thereof is slightly smaller than the outside diameter of the rubber lower mold pin 301b in the lower mold 301, and is constituted as a taper pin of a conical shape whose diameter reduces as it goes to the distal end side. Thus, when the external member 60 is to be set, the dimensional tolerance of the external member 60 can be absorbed, workability can be improved, and the external member 60 can be securely held inside the cavity with an appropriate attitude.

Further, the middle mold 303 is a portion for forming the outline of the upper and lower surfaces and both side surfaces of the first molded body 100 (the upper and lower surfaces and the right and left surfaces in FIG. 6(a)), is constituted of splittable plurality, and is arranged in a predetermined position of the lower mold 301.

As shown in FIG. 10, the resin molding mold 400 is a mold for insert-molding the first molded body 100 to the bracket member 30, includes a lower mold 401 and an upper mold 402 clamped vertically (the up-down direction in FIG. 10; the axial direction of the inner cylinder member 40), and molds the vibration isolation device 1 by pouring (injecting) a resin material from the pouring hole (not shown) into the cavity formed by clamping for solidification.

The lower mold 401 is a portion for forming the outline of the bracket member 30 along with the upper mold 402, and includes an inner cylinder locking part 401a for locking the inner cylinder member 40, and a resin lower mold pin 401b and a resin lower mold seat part 401c for locking the external member 60. Also, because the inner cylinder locking part 401a, the resin lower mold pin 401b and the resin lower mold seat part 401c have the same constitutions with those of the inner cylinder locking part 301a, the rubber lower mold pin 301b and the rubber lower mold seat part 301c in the lower mold 301 of the rubber vulcanizing mold 300, description thereon will be omitted.

The upper mold 402 is constituted so as to be capable of clamping and unclamping by vertically moving (moving in the up-down direction in FIG. 10) with respect to the lower mold 401, and includes an inner cylinder locking part 402a for locking the inner cylinder member 40 and a resin upper mold pin 402b and a resin upper mold seat part 402c for locking the external member 60. Also, because the inner cylinder locking part 402a, the resin upper mold pin 402b and the resin upper mold seat part 402c have the same constitutions with those of the inner cylinder locking part 302a, the rubber upper mold pin 302b and the rubber upper mold seat part 302c in the upper mold 302 of the rubber vulcanizing mold 300, description thereon will be omitted.

Also, in the lower mold 401 and the upper mold 402, press-fitting hole forming pins (not shown) are formed, and in the resin vulcanizing step, two press-fitting holes (the holes to which bushes formed of the respective attachment metals 11, 12 and the elastic bodies 21, 22 vulcanizingly adhered respectively to the outer peripheral surfaces thereof are press-fit; refer to FIG. 1) are penetratingly formed at predetermined positions of the bracket member 30.

The vibration isolation device 1 is manufactured by performing the rubber vulcanizing step first to mold the first molded body 100, and then shifting to the resin molding step to insert-mold the first molded body 100 to the bracket member 30.

That is, in the rubber vulcanizing step, first, the inner cylinder member 40 and the external members 60 are set in the lower mold 301 of the rubber vulcanizing mold 300, then the middle mold 303 is arranged at a predetermined position of the lower mold 301, and thereafter the upper mold 302 is moved down for clamping. Thus, as shown in FIG. 9, the cavity is formed which is a vulcanizing space for vulcanizing a rubber-like elastic body, and therefore the rubber-like elastic body is poured into the cavity from the pouring hole not shown to fill the rubber-like elastic body inside such cavity. Also, by holding the rubber vulcanizing mold 300 for a predetermined period of time in a pressurized and heated state, the rubber-like elastic body (the vibration isolation leg parts 50 and the respective covering rubbers 51 to 53) is vulcanized, and the first molded body 100 is molded.

In this case, in the external member 60, the holes 63a are bored in two locations for each of the pair of the second wall parts 63. The respective holes 63a are arranged in positions deviated to one side from the center of the pair of first wall parts 62 that oppose to each other (refer to FIG. 4(a)). Accordingly, in setting the external member 60 to the lower mold 301 of the rubber vulcanizing mold 300, it is necessary that the respective rubber lower mold pins 301b are appropriately inserted respectively into the respective holes 63a bored in the second wall parts 63.

That is, unless the orientation of the external member 60 is set correctly and the rubber lower mold pins 301b corresponding to each of the respective holes 63a are respectively inserted, the second wall parts 63 of the external member 60 cannot be stored inside the cavity (recess) of the lower mold 301 (because the thickness dimension of the first wall covering rubber 62 is sufficiently smaller than the separation interval between the pair of second wall parts 52). Accordingly, even when the through hole 61a is formed in a deviated position and the external member 60 has directivity, working failure (installation failure) in setting such external member 60 to the rubber vulcanizing mold 300 can be surely suppressed.

Also, in the pair of second wall parts 63, because the holes 63a are bored in two locations for each, in the rubber vulcanizing step, in a state the external members 60 are set to the lower mold 301, rotation of such external members 60 can be surely restricted. Accordingly, in clamping the upper mold 302 to the lower mold 301, the respective rubber upper mold pins 302b can be surely inserted into the respective holes 63a.

Further, because the rubber lower mold pins 301b and the rubber upper mold pins 302b are respectively inserted into the respective holes 63a of each of the pair of the second wall parts 63, the external members 60 can be surely held inside the cavity of the rubber vulcanizing mold 300, and therefore deformation of the external members 60 due to the vulcanizing pressure applied through the rubber-like elastic body can be suppressed.

Also, even in a constitution that the holes 63a, the rubber lower mold pins 301b and the like are arranged by plural numbers as described above in order to suppress the installation failure and deformation of the external member 60, because the holes 63a, the rubber lower mold pins 301b and the like are formed into a simple shape of a circular cross section, manufacture thereof is easy, and the product cost of the vibration isolation device 1 and the rubber vulcanizing mold 300 can be reduced.

Because the respective covering rubbers 51 to 53 covering the external member 60 are formed of a rubber-like elastic body continuing to the vibration isolation leg part 50, the vibration isolation leg part 50 and the respective covering rubbers 51 to 53 can be vulcanizingly molded simultaneously, and the production cost can be reduced correspondingly. Also, by forming the respective covering rubbers 51 to 53 in this way, the entire external member 60 can be covered with the rubber-like elastic body, and therefore corrosion resistance of the external member 60 can be improved.

Here, because the external member 60 arranged inside the cavity of the rubber vulcanizing mold 300 forms a gap between the rubber vulcanizing mold 300 over the entire surface by the thickness of the respective covering rubbers 51 to 53 that cover the outer surface thereof, the external member 60 is liable to be deformed by the vulcanizing pressure applied through the rubber-like elastic body. Particularly, deformation of the base plate part 61 becomes conspicuous compared to that of the second wall parts 63 supported by the rubber lower mold pins 301b and the like. On the other hand, in the vibration isolation device 1 in the present embodiment, because the through hole 61*a* is penetratingly formed in the base plate part 61, the vulcanizing pressure applied through the rubber-like elastic body can be released by the through hole 61*a*, and, as a result, deformation of the external member 60 can be suppressed.

Next, in the resin molding step, the first molded body 100 is set to the lower mold 401 of the resin molding mold 400, and the upper mold 402 is then moved down for clamping. Thus, as shown in FIG. 10, because the cavity is formed which is a space to fill a resin material for solidification, by pouring (injecting) the resin material into the cavity from a pouring hole not shown and holding for a predetermined period of time, the resin material is solidified, and the first molded body 100 is insert-molded to the bracket member 30. Finally, by press-fitting the bushes into the press-fitting holes of the bracket member 30, manufacturing of the vibration isolation device 1 is completed.

In this case, because setting of the first molded body 100 to the lower mold 401 of the resin molding mold 400 is performed by inserting the resin lower mold pins 401*b* into the holes 63*a* bored in the second wall parts 63 of the external member 60, similarly to the case of the rubber vulcanizing step described above, unless the orientation of the first molded body 100 (that is the orientation of the external member 60) is correctly set and the resin lower mold pins 401*b* corresponding to each of the respective holes 63*a* are inserted respectively, the first molded body 100 cannot be stored inside the cavity (recess) of the lower mold 401. Accordingly, even when the through hole 61*a* of the external member 60 is formed in a deviated position and the first molded body 100 has directivity, working failure (installation failure) in setting such first molded body 100 to the resin molding mold 400 can be surely suppressed.

Also, similarly to the case of the rubber vulcanizing step described above, in a state the first molded body 100 is set to the lower mold 401, by inserting the resin lower mold pins 401*b* into each of the holes 63*a* in two locations of the second wall part 63, rotation of the first molded body 100 can be surely restricted. Accordingly, in clamping the upper mold 402 to the lower mold 401, the respective resin upper mold pins 402*b* can be surely inserted into the respective holes 63*a*.

Further, because the resin lower mold pins 401*b* and the resin upper mold pins 402*b* are respectively inserted into the respective holes 63*a* of each of the pair of second wall parts 63, the external member 60 can be securely held inside the cavity of the resin molding mold 400, and therefore deformation of the external member 60 due to the injection pressure of the resin material injected into the cavity can be suppressed.

Furthermore, similarly to the case of the rubber vulcanizing step described above, because the resin lower mold pins 401*b* and the resin upper mold pins 402*b* are formed into a simple shape of a circular cross section, manufacture thereof is easy, and the product cost of the resin molding mold 400 can be reduced.

Here, in the rubber vulcanizing step, the second wall parts 63 of the external member 60 are supported by the rubber lower mold seat part 301*c* and the rubber upper mold seat part 302*c*. The seat surfaces of these rubber lower mold seat part 301*c* and the rubber upper mold seat part 302*c* are concentric with the holes 63*a* and of a ring-shape with a smaller diameter than that of the swelled out part of the second wall part 63, therefore do not come out beyond the outer edge of the second wall part 63, and fall within the plate surface of the second wall part 63. Accordingly, in the second wall covering rubber 53 covering the second wall part 63, only the vicinity of the holes 63*a* is partly recessed, and a recess is not formed in four corners.

That is, according to the conventional manufacturing method, four corners of the second wall parts 63 are supported by a rubber vulcanizing mold, and therefore recesses corresponding to the supporting parts of the rubber vulcanizing mold are formed in four corners of the second wall covering rubber 53. Accordingly, in the resin molding step, sealing performance of the resin material is hardly secured, therefore the structure and shape of the resin molding mold become complicated, and the production cost increases. On the other hand, according to the manufacturing method in the present embodiment, there is no recess in four corners of the second wall covering rubber 53, sealing performance is easily secured, therefore the structure and shape of the resin molding mold 400 can be simplified, and the production cost can be reduced.

Also, when the structure is such that four corners of the second wall part 63 are supported by the rubber vulcanizing mold as in the conventional manufacturing method, if there is a round shape by bending work between the second wall part 63 and the base plate part 61, because such round shape has a large dimensional tolerance, the dimensional tolerance of the support part on the rubber vulcanizing mold side that supports the round shape part is also required to be set large correspondingly, and the positional accuracy of the external member 60 with respect to the rubber vulcanizing mold deteriorates. On the other hand, according to the method for manufacturing in the present embodiment, if the constitution is such that the rubber lower mold pins 301*b* and the like are inserted into the holes 63*a* of the second wall part 63, the dimensional tolerance can be narrowed and the positional accuracy with respect to the rubber vulcanizing mold 300 can be improved. As a result, because the relative positional accuracy of the external member 60 and the inner cylinder member 40 and the vibration isolation leg part 50 can be improved, the static and dynamic characteristics of the vibration isolation device 1 can be stabilized.

Here, in the first molded body 100 molded in the rubber vulcanizing step, the space S is formed in a portion surrounded by the first wall parts 62 and the second wall parts 63 of the external member 60 (that is, the portion surrounded by the first wall covering rubbers 52 and the second wall covering rubbers 53). When a resin material is poured into the cavity of the resin molding mold in the resin molding step, the resin material is filled in the space S. As a result, the first molded body 100 is insert-molded to the bracket member 30 in a state a part of the bracket member 30 is internally fit to the space S.

In this case, because the through hole 61*a* is penetratingly formed in the base plate part 61 of the external member 60, in the resin molding step, the pouring (injecting) pressure of the resin material poured into the cavity of the resin molding mold can be applied to the vibration isolation leg part 50 through the through hole 61*a*. Thus, because pre-compression can be imparted to the vibration isolation leg part 50, the vibration isolation leg part 50 excellent in durability can be manufactured.

Also, because the pre-compression amount imparted to the vibration isolation leg part 50 can be changed by changing the pouring pressure of the resin material, in manufacturing the vibration isolation device 1, the spring characteristic of the vibration isolation leg part 50 can be adjusted. That is, when the characteristic of the vibration isolation leg part 50 is to be adjusted by changing the characteristic of the rubber-like elastic body (rubber hardness for example), because variation of the rubber hardness between lots is large, fine adjustment of the characteristic is difficult. On the other hand, because the pouring (injecting) pressure of the resin material can be adjusted highly finely or easily by setting of the injection molding machine, the spring characteristic of the vibration isolation leg part 50 can be surely adjusted by changing the pre-compression amount.

Further, by increasing the pouring (injecting) pressure of such resin material for example, the resin material filled in the space S can be pushed in to the vibration isolation leg part 50 side through the through hole 61a, and an internally fitting state can be formed in which such resin material is fit in the vibration isolation leg part 50 while penetrating the through hole 61a (however, in FIG. 11 and FIG. 12 described below, a molding state of a case the pouring pressure of the resin material is low is illustrated). Accordingly, when such internally fitting state is formed, the vibration isolation device 1 capable of surely preventing coming-off of the external member 60 from the bracket member 30 can be manufactured.

The detailed constitution of the vibration isolation device 1 constituted as described above will be described referring to FIG. 11 and FIG. 12. FIG. 11 and FIG. 12 are partial cross-sectional views of the vibration isolation device 1, and correspond to the cross sections shown in FIG. 7(a) and FIG. 7(b) respectively. Also, in FIG. 11, counterpart parts 500 are illustrated which are arranged so as to oppose the second wall covering rubbers 53 when the vibration isolation device 1 is assembled to a vehicle. Further, in FIG. 12, a part of the vibration isolation device 1 is partially and enlargingly illustrated, and in such enlarged portion, in order to simplify the drawing, illustration of the cross-sectional line of the bracket member 30 and the respective covering rubbers 51, 52 is omitted.

Figure 11:
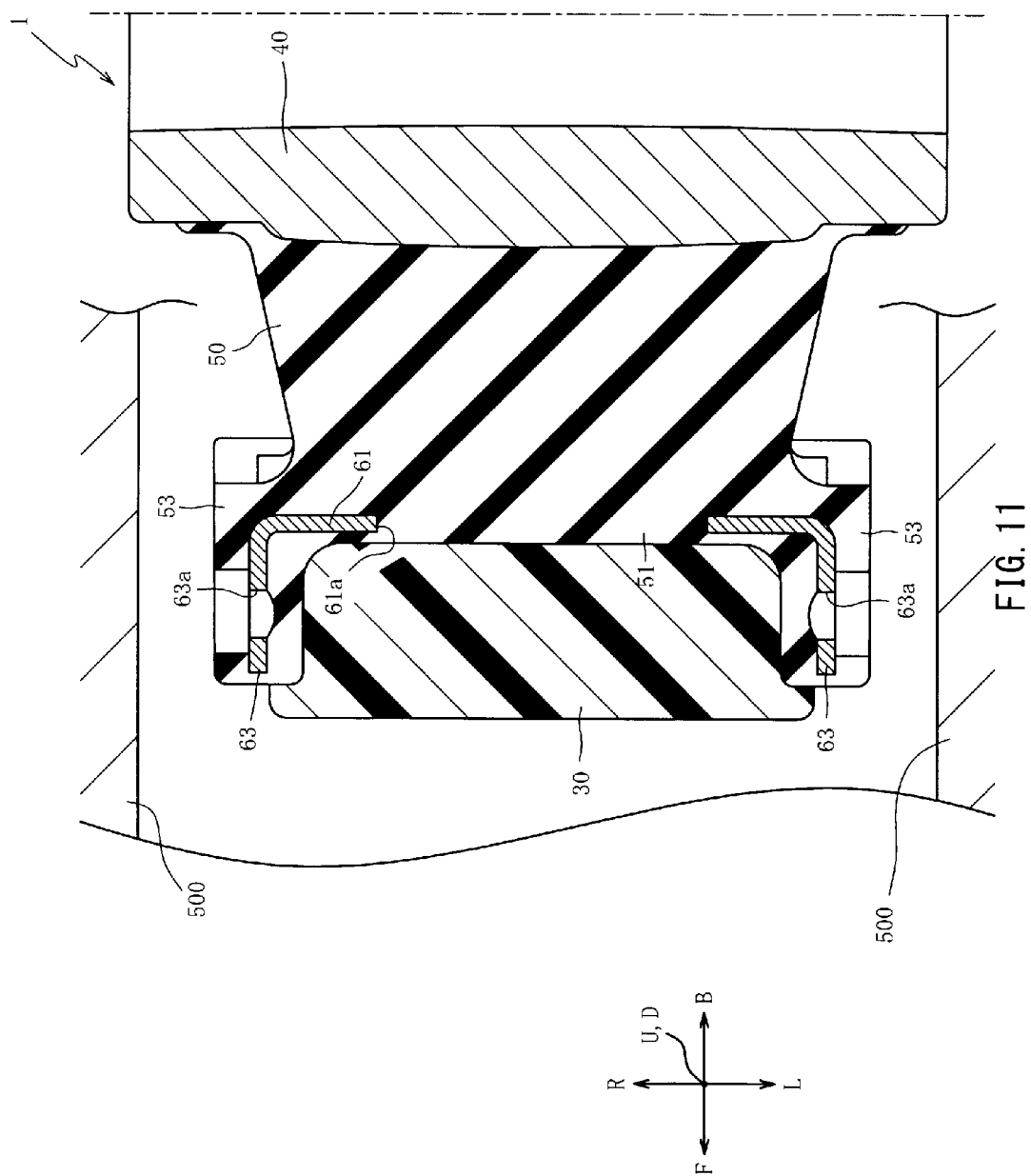
FIG. 11 is a partial cross-sectional view of the vibration isolation device.
Figure 12:
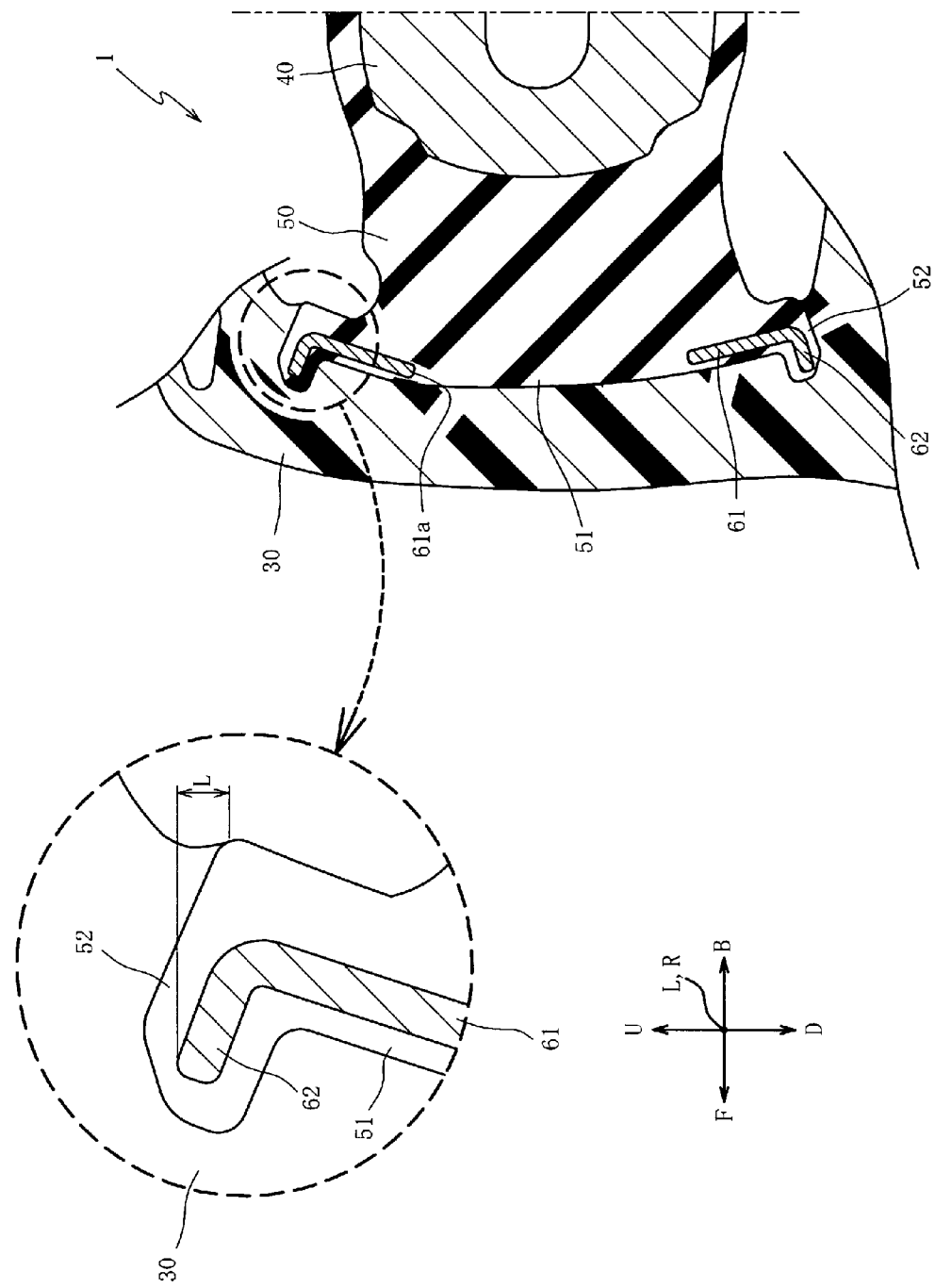
FIG. 12 is a partial cross-sectional view of the vibration isolation device.

As shown in FIG. 11 and FIG. 12, the other end side of the vibration isolation leg part 50 (the left side in FIG. 11 and FIG. 12) is vulcanizingly adhered to the rear surface side of the base plate part 61, the pair of first wall parts 62 are extended in a tapered shape and the pair of second wall parts 63 are extended maintaining a parallel state toward the bracket member 30 (that is toward the opposite side of the vibration isolation leg part 50) from the outer edge of the base plate part 61, and the first wall parts 62 and the second wall parts 63 are embedded in the bracket member 30 while being connected to each other in the peripheral direction (that is along the outer edge of the base plate part 61).

Accordingly, movement of the external member 60 in the vehicle left and right directions (the directions of the arrows L, R; the up and down directions in FIG. 11) with respect to the bracket member 30 can be restricted by engagement of the pair of second wall parts 63 and the internally fit section of the bracket member 30 internally fit between the pair of second wall parts 63 that oppose to each other.

Also, movement of the external member 60 in the vehicle up and down directions (the directions of the arrows U, D; the up and down directions in FIG. 12) with respect to the bracket member 30 can be restricted by engagement of the pair of first wall parts 62 and the internally fit section of the bracket member 30 internally fit between the pair of first wall parts 62 that oppose to each other and engagement of the pair of first wall parts 62 and the embracing section of the bracket member 30 that embraces the pair of first wall parts 62.

Further, movement of the external member 60 in the vehicle front and back directions (the directions of the arrows F, B; the right and left directions in FIG. 12) and toward the direction of coming-off from the bracket member 30 (the right direction in FIG. 12) with respect to the bracket member 30 can be restricted by engagement of the pair of first wall parts 62 and the protruded sections of the bracket member 30 protruded to the outer surface side of the pair of first wall parts 62 (that is the sections shown by the ranges L in FIG. 12).

As described above, because it is constructed that engagement of the external member 60 and the bracket member 30 is attained by embedding the pair of first wall parts 62 of the external member 60 in the bracket member 30, it is not necessary to make the bracket member 30 to extend toward the vibration isolation leg part 50 in order to engage with the external member 60, and formation of an under-cut shape as occurred in a conventional one can be suppressed. Accordingly, the structure of the resin molding mold 400 that molds the bracket member 30 can be simplified.

Also, because the vibration isolation device 1 can restrict movement of the external member 60 with respect to the bracket member 30 in respective directions, even when the inner cylinder member 40 is displaced in any direction, the engaged state of the external member 60 and the bracket member 30 can be maintained, and such external member 60 can be prevented from coming-off from the bracket member 30.

Here, the external member 60 can be manufactured easily while allowing restriction of movement with respect to the bracket member 30 in respective directions. That is, because the external member 60 is formed into a shape in which the plate-like first and second wall parts 62, 63 are extended toward one side from the outer edge of the plate-like base plate part 61 (so-called container shape), it can be manufactured simply by subjecting one flat raw plate with drawing work by a press machine using a punch and a die. Accordingly, the production cost of the external member 60 can be reduced, and the product cost of the total vibration isolation device 1 can be reduced correspondingly.

In this case, the ends of the first wall parts 62 and the second wall parts 63 are connected to each other, that is, they are formed so as to continue to each other in the peripheral direction, and therefore the strength in the bending direction of the respective wall parts 62, 63 (the direction of rocking with respect to the base plate part 61) can be increased. Accordingly, because the plate thickness of the external member 60 can be reduced correspondingly, the material cost can be reduced, and the weight can be reduced.

Also, because the second wall covering rubbers 53 covering the second wall parts 63 are formed so as to protrude to the counterpart parts 500 side from the outer surfaces of the bracket member 30, such second wall covering rubbers 53 can be utilized as stopper parts that abut on the counterpart parts 500 and restrict the displacement thereof. In this case, because the flat plate-like second wall parts 63 with one pair thereof arranged in parallel are embedded in the second wall covering rubbers 53, the impact force generated when the counterpart parts 500 are abutted thereon can be received by the second wall parts 63, and the load of the bracket member 30 can be lowered. Thus, even when the bracket member 30 is formed of a resin material, durability thereof can be improved.

Further, because the ends of the second wall parts 63 are connected to the ends of the first wall parts 62 and the strength in the bending direction is increased as described above, the impact force generated when the counterpart parts 500 are abutted thereon can be securely received, and durability of not only the external member 60 but also of the bracket member 30 can be improved.

Figure 13A:
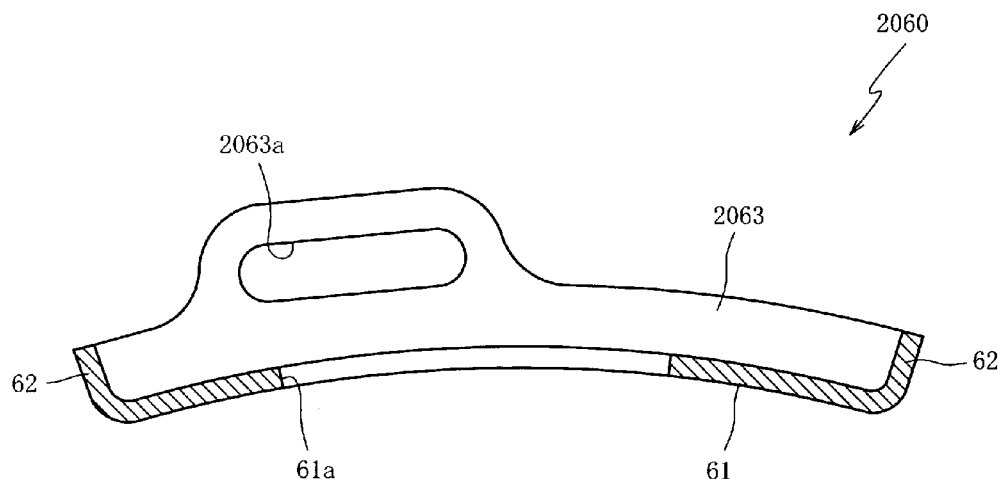
FIG. 13(a) is a cross-sectional view of an external member in the second embodiment.
Figure 13B:
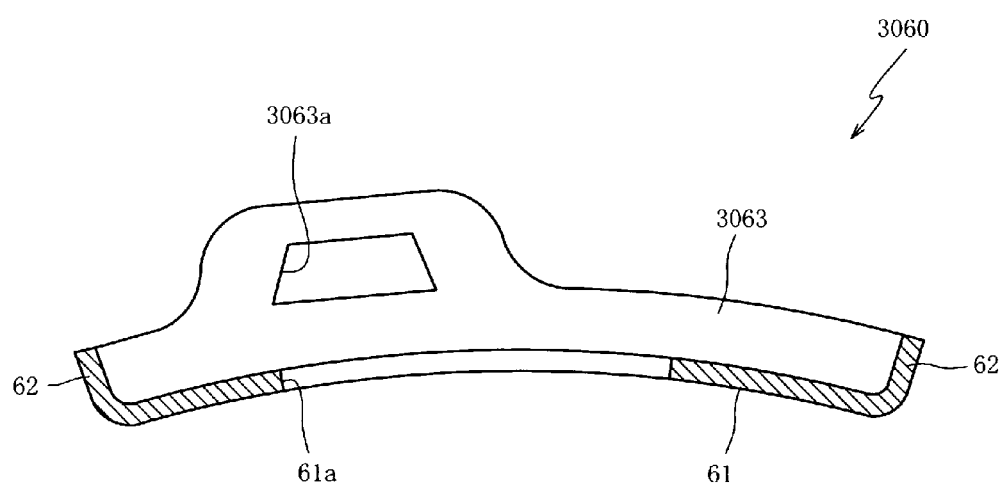
FIG. 13(b) is a cross-sectional view of an external member in the third embodiment.

Next, the second and third embodiments will be described referring to FIG. 13. FIG. 13(a) is a cross-sectional view of an external member 2060 in the second embodiment, and FIG. 13(b) is a cross-sectional view of an external member 3060 in the third embodiment. Also, FIG. 13(a) and FIG. 13(b) correspond to the cross-sectional view of the external member taken along a line IVa-IVa of FIG. 3(a).

In the first embodiment, the case in which the holes 63a of a circular shape in a front view are bored in the second wall parts 63 of the external member 60 has been described. However, in second wall parts 2063, 3063 of the external members 2060, 3060 in the second and third embodiments, holes 2063a, 3063a of an elongated circle shape in a front view and of a trapezoidal shape in a front view are bored. Also, the same sections as those of the first embodiment described above will be marked with same reference signs, and description thereon will be omitted.

As shown in FIG. 13(a) and FIG. 13(b), the second wall parts 2063, 3063 correspond to the second wall parts 63 in the first embodiment, and are flat plate-like portions with one pair being arranged so as to oppose to each other while maintaining a parallel state. In the second wall parts 2063, the holes 2063a of an elongated circle shape in a front view are bored in two locations in total, one location for each of the respective second wall parts 2063. Similarly, in the second wall parts 3063, the holes 3063a of a trapezoidal shape in a front view are bored in two locations in total, one location for each of the respective second wall parts 3063.

As shown in FIG. 13(a) and FIG. 13(b), the respective holes 2063a, 3063a are arranged in positions deviated to one first wall part 62 side out of the pair of first wall parts 62 (the left side in FIG. 13(a) and FIG. 13(b)). Also, in the second wall parts 2063, 3063, a swelled out part is formed so as to swell out from the outer edge, and the respective holes 2063a, 3063a are surrounded by the swelled out part.

Here, the pair of second wall parts 2063 and the pair of second wall parts 3063 are respectively formed into the same shape as each other including the layout of the holes 2063a, 3063a. Accordingly, similarly to the case of the first embodiment, the external members 2060, 3060 can be used commonly for both of the right and left sides of the vibration isolation device 1 (the first molded body 100).

Also, the outlines of the rubber lower mold pin, the rubber upper mold pin, the resin lower mold pin, and the resin upper mold pin of the rubber vulcanizing mold and the resin molding mold are formed into a shape corresponding to the respective holes 2063a, 3063a (that is the cross section of an elongated circle shape or the cross section of a trapezoidal shape), and the external members 2060, 3060 are positioned to a predetermined position by inserting the respective pins into the respective holes 2063a, 3063a.

Further, the rubber lower mold seat part, the rubber upper mold seat part, the resin lower mold seat part, and the resin upper mold seat part are formed into an outline larger than the respective pins and an outline smaller than the swelled out part (that is a shape falling inside the outer surface of the second wall parts 2063, 3063), and the step surface of a flat surface shape formed between each of the seat parts and each of the pins is made to be a seat surface that abuts on and supports the outer surface of the second wall parts 2063, 3063.

Accordingly, in the second and third embodiments also, similarly to the case of the first embodiment, working failure (installation failure) in setting the external members 2060, 3060 to the rubber vulcanizing mold can be suppressed. Also, rotation of such external members 2060, 3060 can be restricted in a state in which the external members 2060, 3060 are set to the lower mold, and therefore in clamping the upper mold to the lower mold, the respective rubber upper mold pins can be surely inserted into the respective holes 2063a, 3063a.

Further, similarly to the case of the first embodiment, because the respective pins are respectively inserted into the respective holes 2063a, 3063a of each of the pair of second wall parts 2063, 3063, deformation of the external members 2060, 3060 due to the vulcanizing pressure applied through the rubber-like elastic body can be suppressed.

Also, similarly to the case of the first embodiment, because the first molded body can be formed without forming recesses in four corners of the second wall covering rubber, sealing performance in the resin molding step can be easily secured. Accordingly, the structure and shape of the resin molding mold can be simplified, and the production cost thereof can be reduced.

Also, similarly to the case of the first embodiment, by adopting the mold structure of locking the respective holes 2063a, 3063a of the external members 2060, 3060 by the respective pins, compared to the case of the structure of supporting four corners, the positional accuracy of the external members 2060, 3060 with respect to the rubber vulcanizing mold can be improved and the relative positional accuracy with respect to the inner cylinder member 40 and the vibration isolation leg part 50 can be improved, and therefore the static and dynamic characteristics of the vibration isolation device can be stabilized.

Figure 14:
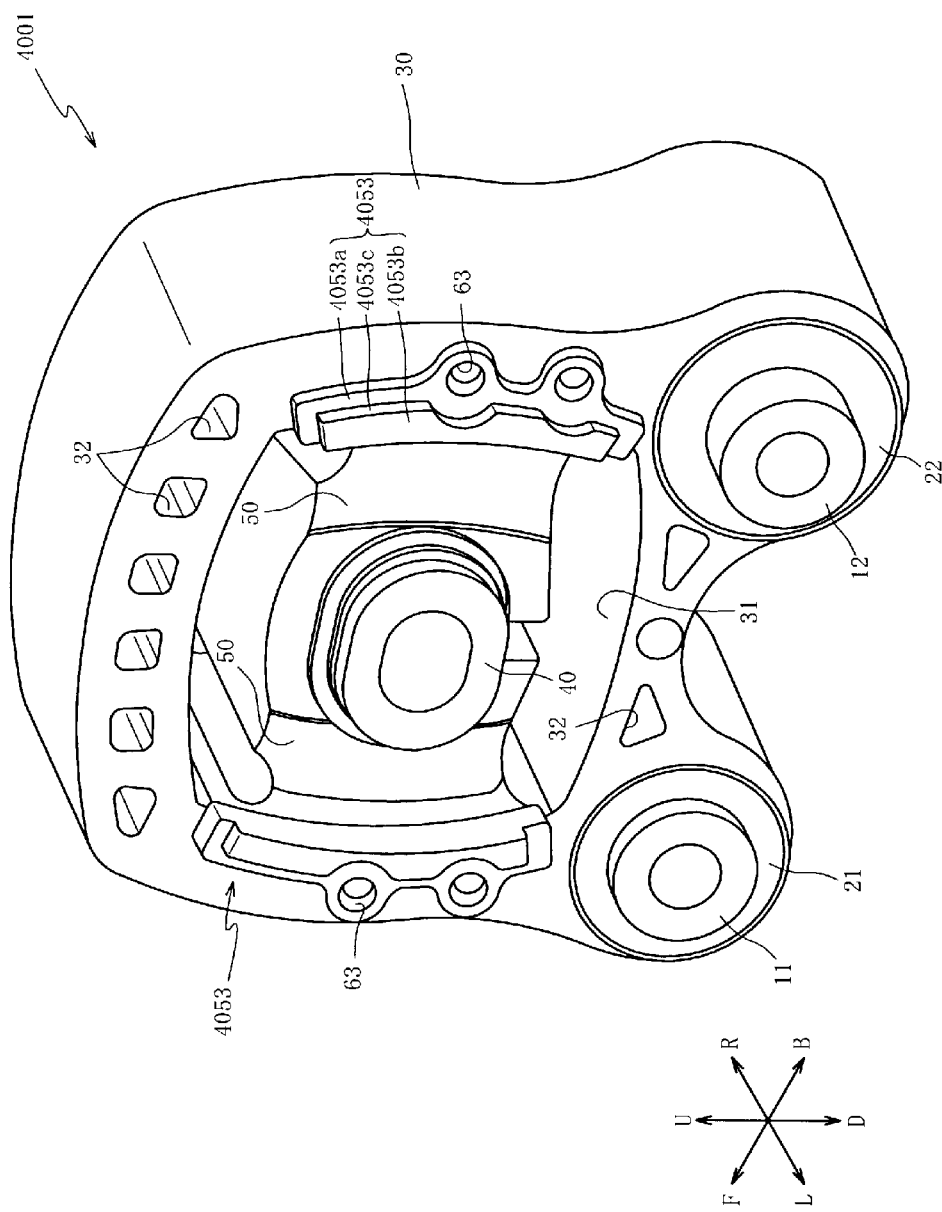
FIG. 14 is a perspective view of the vibration isolation device in the fourth embodiment of the present invention.

Next, the fourth embodiment will be described referring to FIG. 14 to FIG. 25. Also, the same sections as those of respective embodiments described above will be marked with same reference signs, and description thereon will be omitted. First, the total constitution of a vibration isolation device 4001 in the fourth embodiment will be described referring to FIG. 14 and FIG. 15. FIG. 14 is a perspective view of the vibration isolation device 4001 in the fourth embodiment of the present invention, FIG. 15(a) is a front view of the vibration isolation device 4001, and FIG. 15(b) is a side view of the vibration isolation device 4001. Also, in FIG. 14 and FIG. 15, the directions of arrows F, B show the vehicle front and back directions, the directions of arrows L, R show the vehicle left and right directions, and the directions of arrows U, D show the vehicle up and down directions respectively.

As shown in FIG. 14 and FIG. 15, the vibration isolation device 4001 in the fourth embodiment is constituted similarly to the vibration isolation device 1 in the first embodiment with the exception that a second wall covering rubber 4053 is different from the second wall covering rubber 53 in the first embodiment. That is, the vibration isolation device 4001 is constituted to mainly include the short-axis attachment implement 11 and the long-axis attachment implement 12, the elastic bodies 21, 22 vulcanizingly adhered to the outer peripheral surfaces of both of the attachment implements 11, 12, the bracket member 30 formed of a resin material, the inner cylinder member 40 attached on the vibration source side, the pair of vibration isolation leg parts 50 whose one end sides are connected to the inner cylinder member 40, and the pair of external members 60 (refer to FIG. 7) to which the other end sides of the pair of vibration isolation leg parts 50 are connected respectively.

The second wall covering rubbers 4053 protruded from the outer surfaces that become the front surface and the back surface of the bracket member 30 (the left side surface and the right side surface in FIG. 15(b)) toward the axial direction of the inner cylinder member 40 (the right-left direction in FIG. 15) continue to the other end sides of the vibration isolation leg parts 50. The second wall covering rubber 4053 includes a seal surface part 4053a and a stopper surface part 4053b. The stopper surface part 4053b is arranged so as to continue to the seal surface part 4053a through a step 4053c, and is protruded toward the axial direction of the inner cylinder member 40 beyond the seal surface part 4053*a* by the amount of the step 4053*c*. That is, the protruding height from the outer surface of the bracket member 30 of the stopper surface part 4053*b* is made higher than that of the seal surface part 4053*a*. When the counterpart part 500 (refer to FIG. 24) fastened and fixed to the inner cylinder member 40 is relatively displaced in inputting a large displacement, the stopper surface part 4053*b* abuts on the counterpart part and acts as a stopper part that restricts the displacement.

Figure 16:
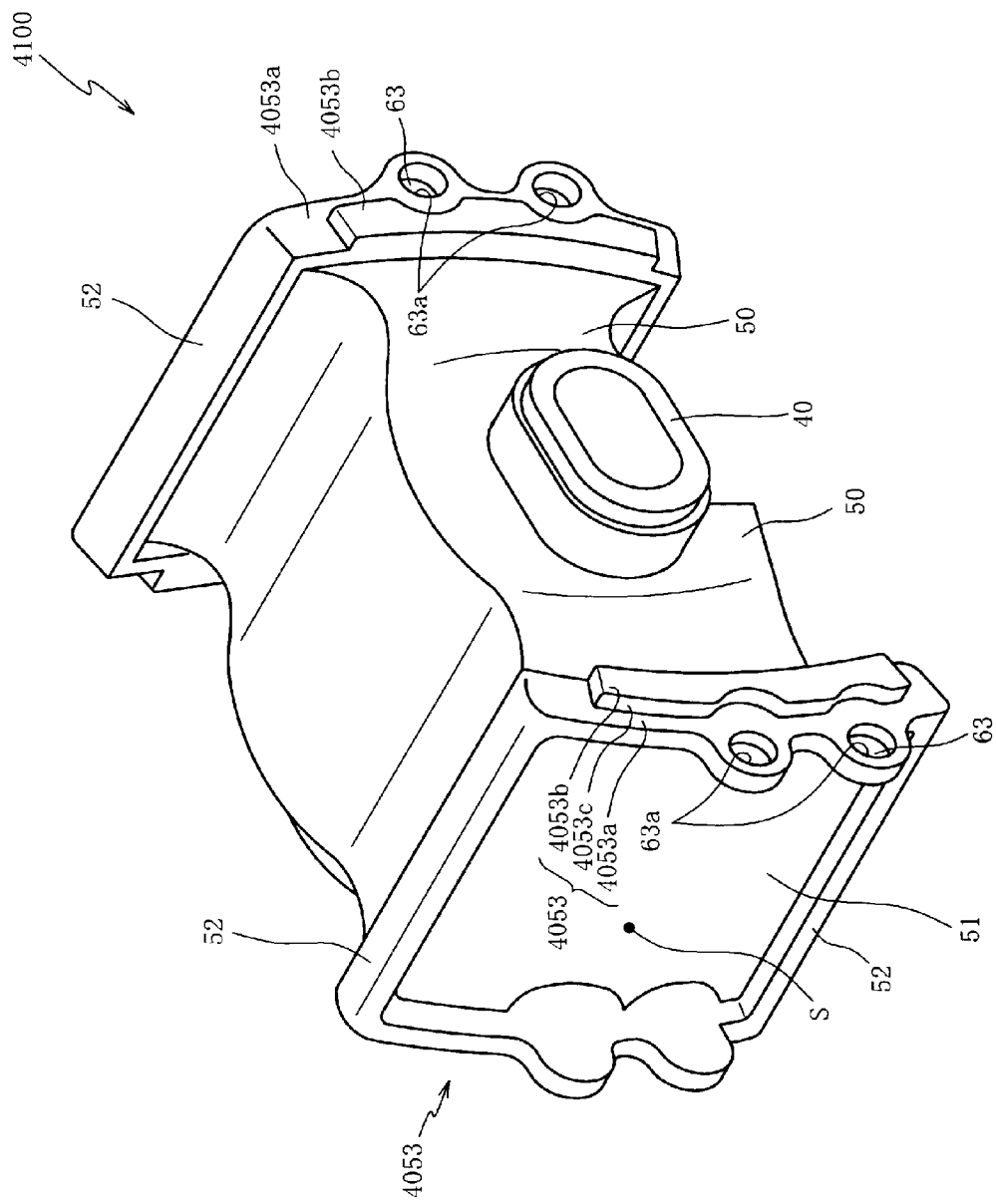
FIG. 16 is a perspective view of the first molded body.
Figures 17A, 17B:
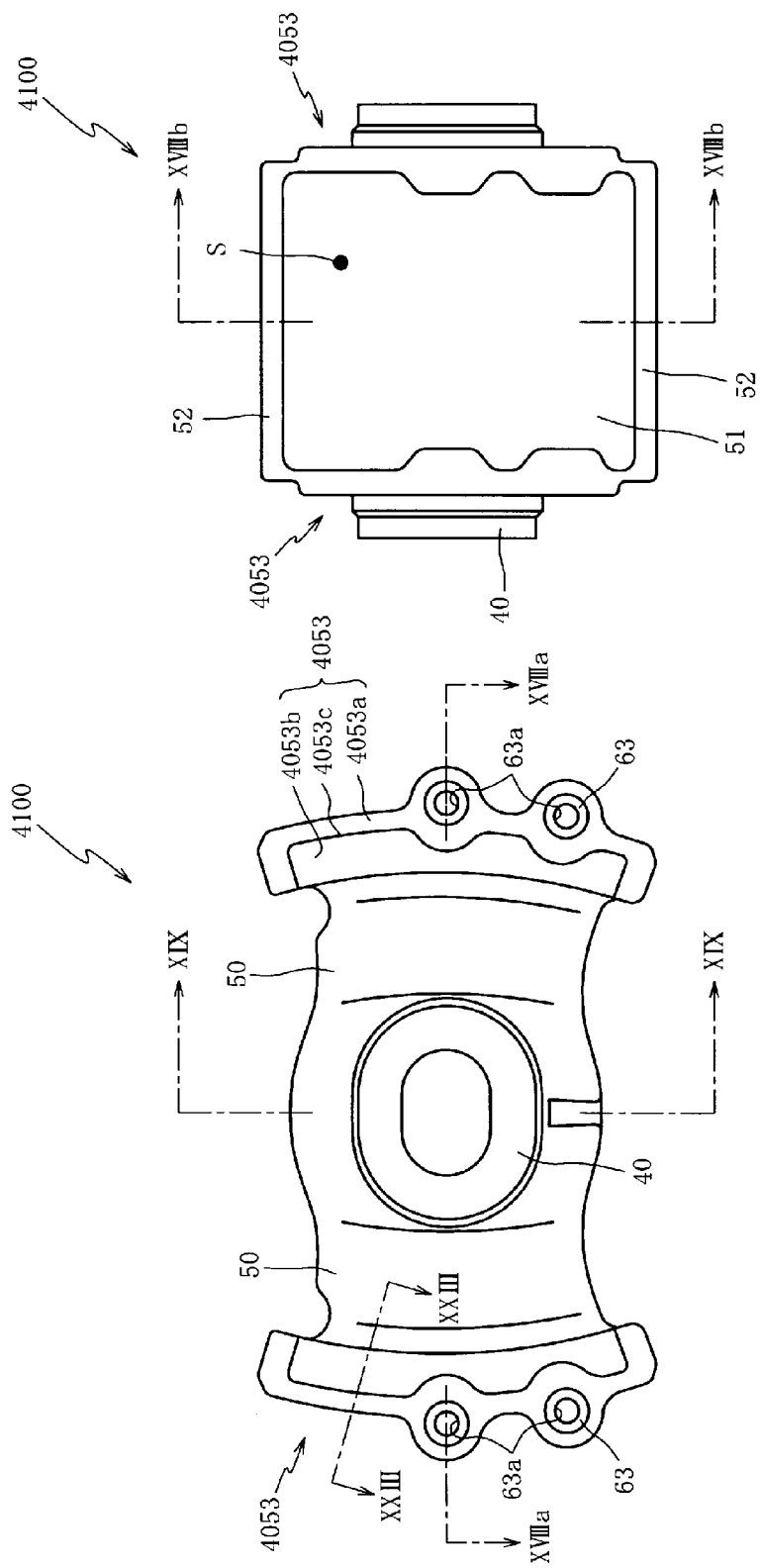
FIG. 17(a) is a front view of the first molded body.
FIG. 17(b) is a side view of the first molded body.
Figure 18A:
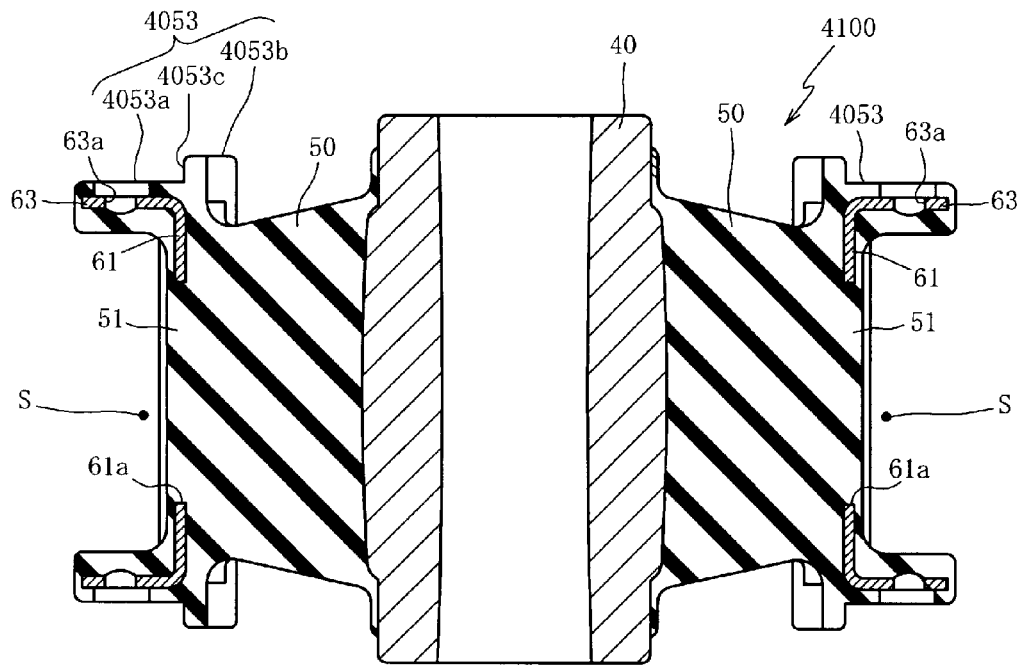
FIG. 18(a) is a cross-sectional view of the first molded body taken along a line XVIIIa-XVIIIa of FIG. 17(a)
Figure 18B:
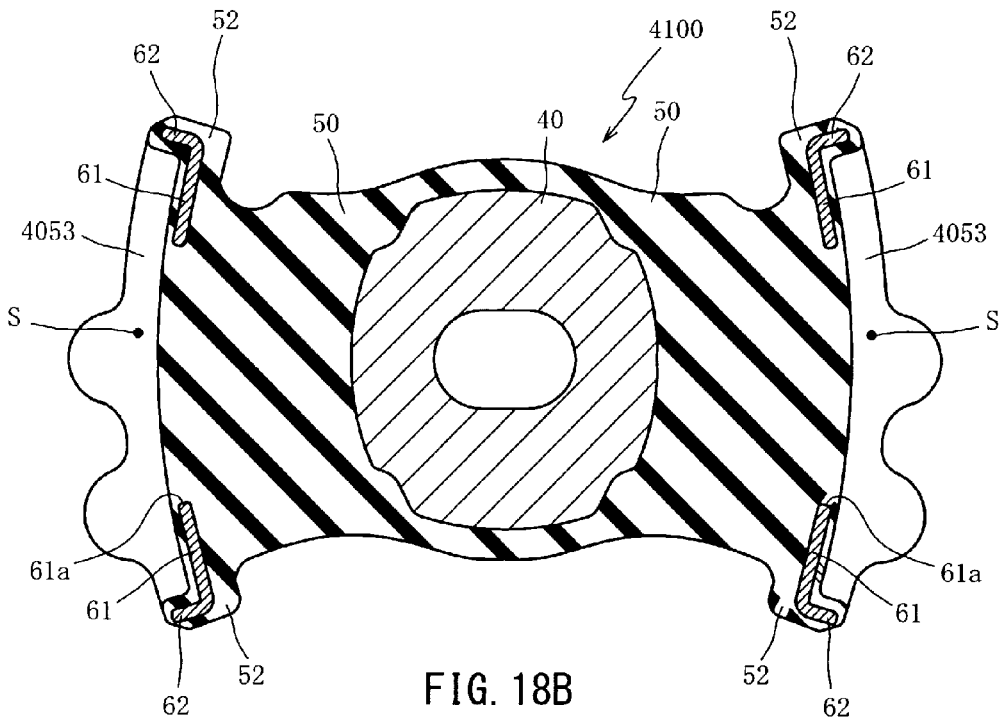
FIG. 18(b) is a cross-sectional view of the first molded body taken along a line XVIIIb-XVIIIb of FIG. 17(b).
Figure 19:
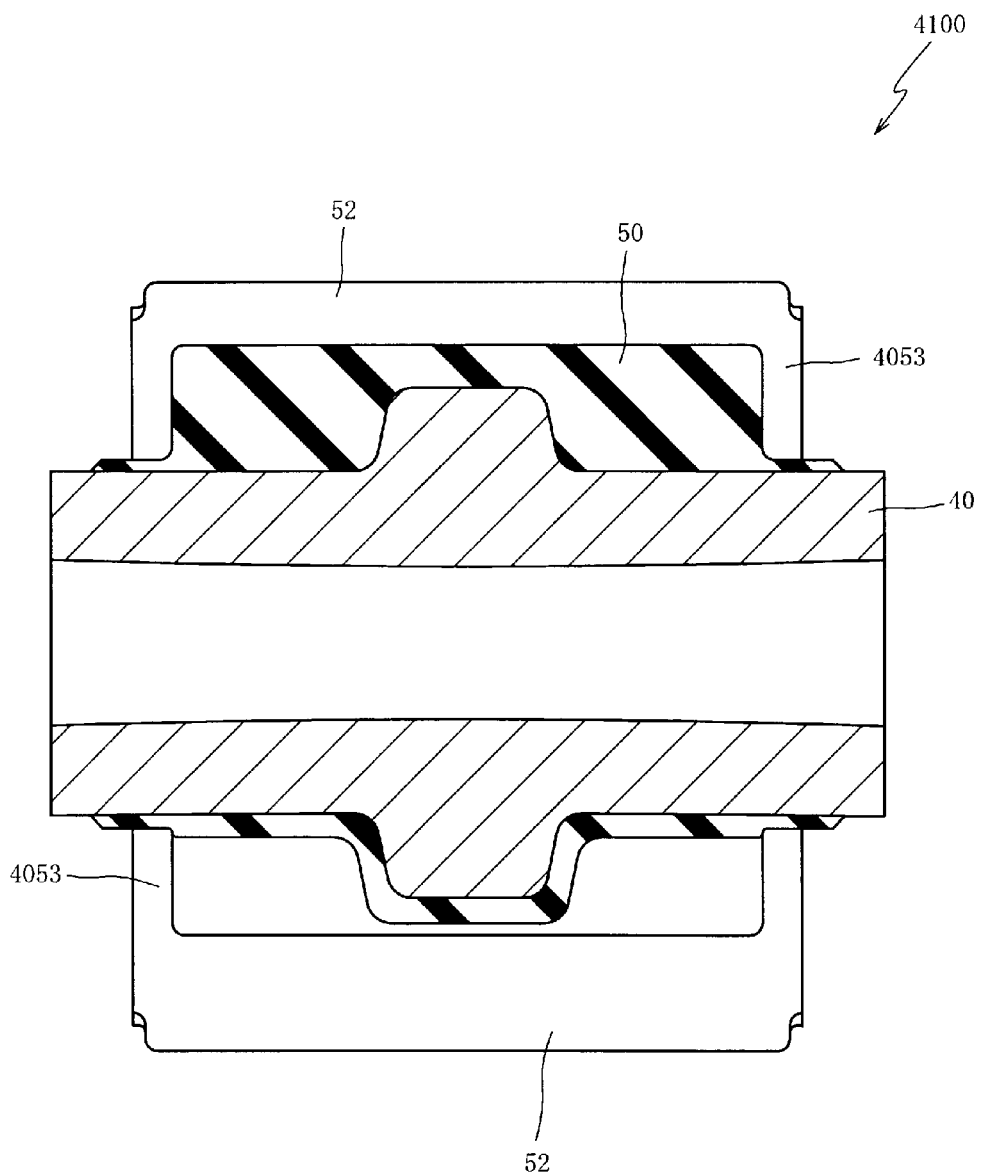
FIG. 19 is a cross-sectional view of the first molded body taken along a line XIX-XIX of FIG. 17(a).

Next, a first molded body 4100 will be described referring to FIG. 16 to FIG. 19. FIG. 16 is a perspective view of the first molded body 4100. FIG. 17(*a*) is a front view of the first molded body 4100, and FIG. 17(*b*) is a side view of the first molded body 4100. Also, FIG. 18(*a*) is a cross-sectional view of the first molded body 4100 taken along a line XVIIIa-XVIIIa of FIG. 17(*a*), FIG. 18(*b*) is a cross-sectional view of the first molded body 4100 taken along a line XVIIIb-XVIIIb of FIG. 17(*b*), and FIG. 19 is a cross-sectional view of the first molded body 4100 taken along a line XIX-XIX of FIG. 17(*a*).

As shown in FIG. 16 to FIG. 19, the first molded body 4100 is a primary working product in a process for manufacturing the vibration isolation device 4001 (the vulcanizing step using a rubber vulcanizing mold 4300), and is constituted similarly to the first molded body 1 in the first embodiment except that the second wall covering rubber 4053 is different from the second wall covering rubber 53 in the first embodiment. That is, the first molded body 4100 mainly includes the inner cylinder member 40, the pair of vibration isolation leg parts 50 whose one end sides are connected to the inner cylinder member 40, the pair of external members 60 to which the other end sides of the pair of vibration isolation leg parts 50 are connected respectively, and respective covering rubbers 51, 52 and the second wall covering rubber 4053 that cover the external members 60, and are formed symmetrically in the right and left (the right and left in FIG. 17(*a*)).

The respective covering rubbers 51, 52 and the second wall covering rubbers 4053 covering the outer surface of the external members 60 continue to the vibration isolation leg parts 50.

The first wall covering rubbers 52 cover the outer surfaces of the pair of first wall parts 62 with a constant thickness dimension respectively, and the second wall covering rubbers 4053 cover the outer surfaces of the pair of second wall parts 63 with a constant thickness dimension respectively. Also, in the second wall covering rubber 4053, a section where the thickness dimension is made thick (the stopper surface part 4053*b*) is formed partially. Further, into the holes 63*a* of the second wall parts 63, the rubber lower mold pin 301*b* and the rubber upper mold pin 302*b* of the rubber vulcanizing mold 4300 are inserted, and therefore the second wall covering rubber 4053 is not filled. Similarly, because the rubber mold seat parts 301*c*, 302*c* of the rubber vulcanizing mold 4300 abut on the outer surfaces of the second wall parts 63 (the surfaces on the side opposite to the opposing surface), recesses of a shape corresponding to the rubber mold seat parts 301*c*, 302*c* are formed in the second wall covering rubber 4053 (the seal surface part 4053*a*). Also, in the second wall covering rubbers 4053 that cover the opposing surface side of the second wall parts 63, the thickness dimension is made thick only in portions corresponding to the holes 63*a*.

Because respective covering rubbers 51, 52 and the second wall covering rubber 4053 cover the outer surfaces of the external member 60 with a predetermined thickness dimension as described above, the space S is formed between the opposing surfaces of the first wall parts 62 and the second wall parts 63 of the external member 60 (that is the portion surrounded by the base plate part 61, the first wall parts 62 and the second wall parts 63). To such space S, a part of the bracket member 30 is internally fit as described below.

Also, as described above, the second wall covering rubber 4053 includes the seal surface part 4053*a* and the stopper surface part 4053*b*. The seal surface part 4053*a* is arranged so as to continue to the first wall covering rubber 52, and the outer surface thereof (the surface on the side opposite to the space S) is formed into a flat plate shape orthogonal to the axial direction of the inner cylinder member 40. The stopper surface part 4053*b* is formed into an outline smaller than that of the seal surface part 4053*a*, is positioned along the edge on the inner cylinder member 40 side in a front view (refer to FIG. 17(*a*)) and is protruded from the outer surface of the seal surface part 4053*a* toward the axial direction of the inner cylinder member 40, and the step 4053*c* is formed between the stopper surface part 4053*b* and the seal surface part 4053*a*.

Figure 20:
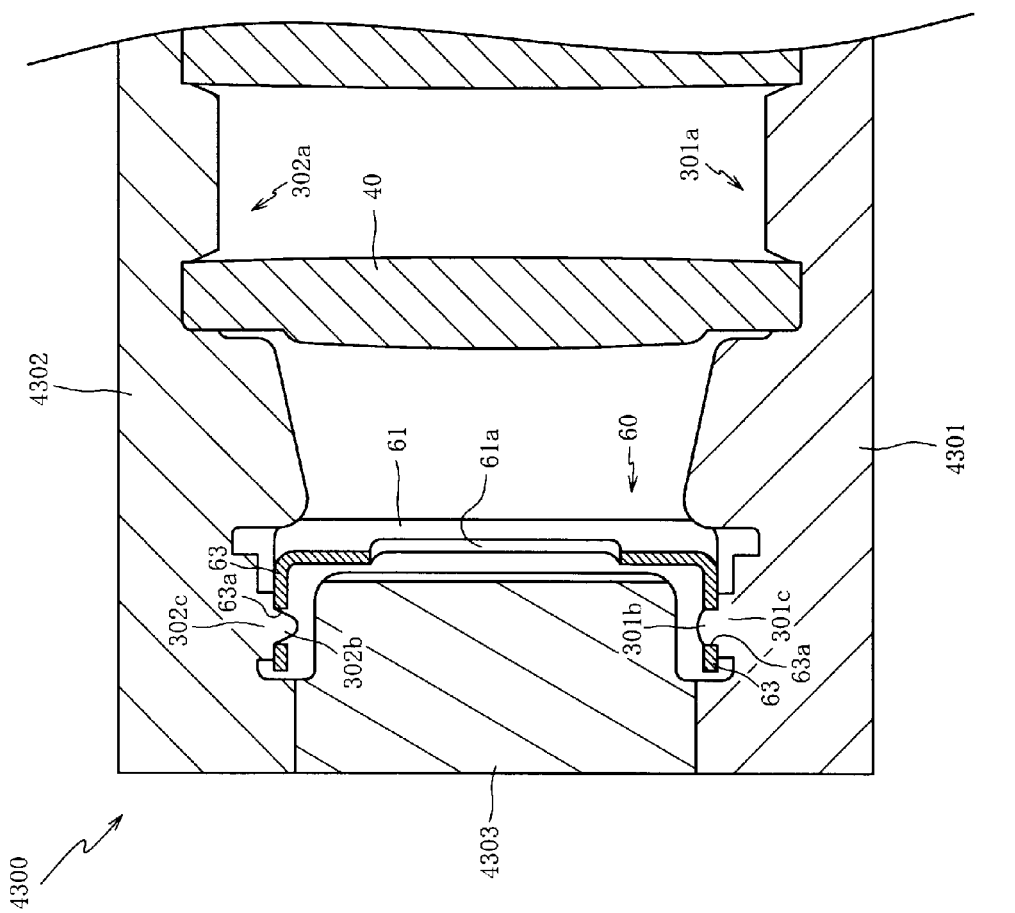
FIG. 20 is a cross-sectional view of the rubber vulcanizing mold set with the inner cylinder member and the external members and clamped.
Figure 21:
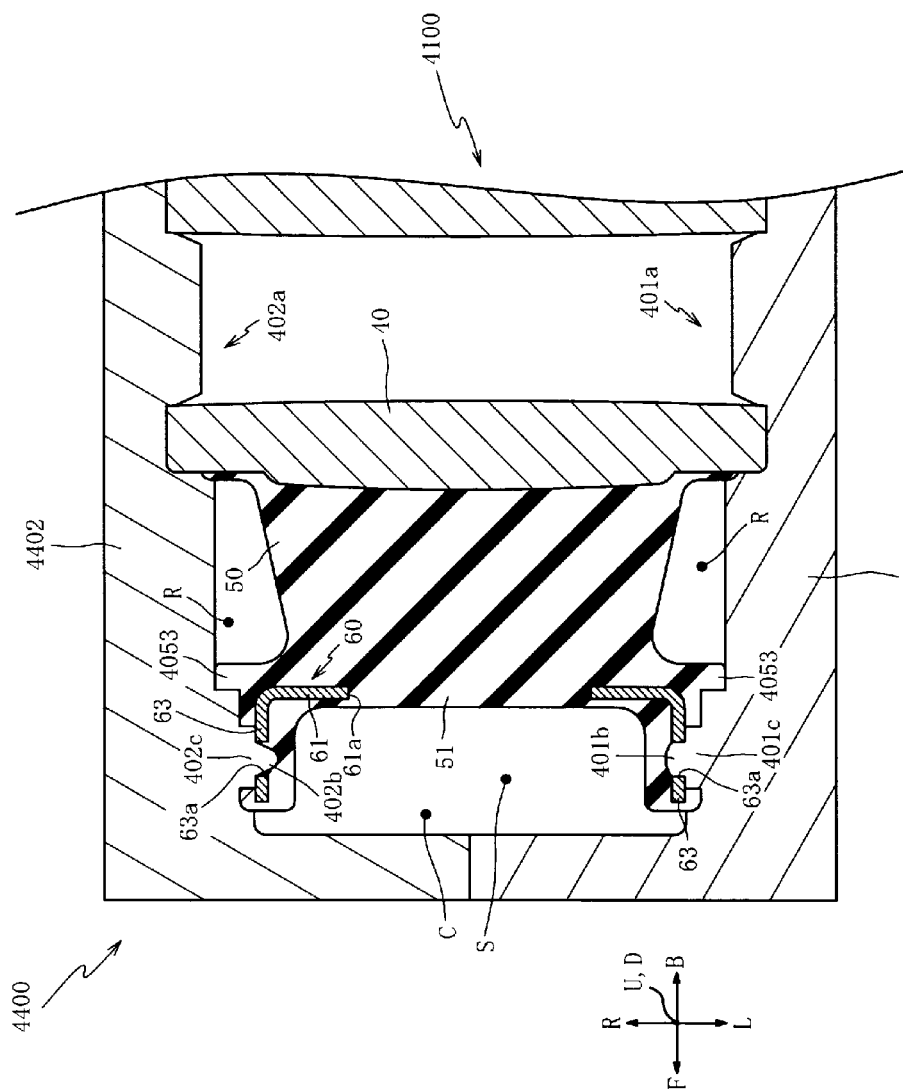
FIG. 21 is a cross-sectional view of a resin molding mold set with the first molded body and clamped.

Next, the manufacturing method of the vibration isolation device 4001 will be described referring to FIG. 20 to FIG. 23. FIG. 20 is a cross-sectional view of the rubber vulcanizing mold 4300 set with the inner cylinder member 40 and the external members 60 and clamped, and illustrates a state before the rubber-like elastic body is poured into the cavity. Also, FIG. 21 is a cross-sectional view of a resin molding mold 4400 set with the first molded body 4100 and clamped, and illustrates a state before the resin material is poured into the cavity C. Further, the cross sections in FIG. 20 and FIG. 21 correspond to the cross section shown in FIG. 18(*a*).

As shown in FIG. 20, the rubber vulcanizing mold 4300 is a mold for vulcanizingly molding the first molded body 4100, includes a lower mold 4301 and an upper mold 4302 clamped vertically (the up-down direction in FIG. 20; the axial direction of the inner cylinder member 40) and a middle mold 4303 embraced between the upper and lower molds 4301, 4302, and molds the first molded body 4100 (refer to FIG. 16) by vulcanizing the rubber-like elastic body poured from a pouring hole (not shown) into the cavity formed by clamping and filled in the rubber vulcanizing step.

The lower mold 4301 is a portion for forming the outline on the front surface side (the front side of the paper in FIG. 17(*a*)) of the first molded body 4100, and includes the inner cylinder locking part 301*a* for locking the inner cylinder member 40 and the rubber lower mold pin 301*b* and the rubber lower mold seat part 301*c* for locking the external member 60.

The upper mold 4302 is a section for forming the outline of the back surface side of the first molded body 4100 (the back side of the paper in FIG. 17(*a*)), is constituted so as to be capable of clamping and unclamping by vertically moving with respect to the lower mold 4301 (moving in the up-down direction in FIG. 20), and includes the inner cylinder locking part 302*a* for locking the inner cylinder member 40, and the rubber upper mold pin 302*b* and the rubber upper mold seat part 302*c* for locking the external member 60.

Further, the middle mold 4303 is a portion for forming the outline of the upper and lower surfaces and both side surfaces of the first molded body 4100 (the upper and lower surfaces and the right and left surfaces in FIG. 17(*a*)), is constituted of a splittable plurality, and is arranged in a predetermined position of the lower mold 4301.

As shown in FIG. 21, the resin molding mold 4400 is a mold for insert-molding the first molded body 4100 to the bracket member 30, includes a lower mold 4401 and an upper mold 4402 clamped vertically (the up-down direction in FIG. 21; the axial direction of the inner cylinder member 40), and molds the vibration isolation device 4001 by pouring (injecting) a resin material from a pouring hole (not shown) into the cavity C formed by clamping for solidification.

The lower mold 4401 is a portion for forming the outline of the bracket member 30 along with the upper mold 4402, and includes the inner cylinder locking part 401a for locking the inner cylinder member 40, and the resin lower mold pin 401b and the resin lower mold seat part 401c for locking the external member 60.

The upper mold 4402 is constituted so as to be capable of clamping and unclamping by vertically moving (moving in the up-down direction in FIG. 21) with respect to the lower mold 4401, and includes the inner cylinder locking part 402a for locking the inner cylinder member 40 and the resin upper mold pin 402b and the resin upper mold seat part 402c for locking the external member 60.

Also, in the lower mold 4401 and the upper mold 4402, press-fitting hole forming pins (not shown) are formed, and in the resin vulcanizing step, two press-fitting holes (the holes to which bushes formed of the respective attachment metals 11, 12 and the elastic bodies 21, 22 vulcanizingly adhered respectively to the outer peripheral surfaces thereof are press-fit; refer to FIG. 14) are penetratingly formed at predetermined positions of the bracket member 30.

The vibration isolation device 4001 is manufactured by performing the rubber vulcanizing step first to mold the first molded body 4100, and then shifting to the resin molding step to insert-mold the first molded body 4100 to the bracket member 30.

That is, in the rubber vulcanizing step, first, the inner cylinder member 40 and the external members 60 are set in the lower mold 4301 of the rubber vulcanizing mold 4300, then the middle mold 4303 is arranged at a predetermined position of the lower mold 4301, and thereafter the upper mold 4302 is moved down for clamping. Thus, as shown in FIG. 20, the cavity is formed which is a vulcanizing space for vulcanizing a rubber-like elastic body, and therefore the rubber-like elastic body is poured into the cavity from a pouring hole not shown to fill the rubber-like elastic body inside such cavity. Also, by holding the rubber vulcanizing mold 4300 for a predetermined period of time in a pressurized and heated state, the rubber-like elastic body (the vibration isolation leg parts 50, the respective covering rubbers 51, 52 and the second wall covering rubbers 4053) is vulcanized, and the first molded body 4100 is molded.

In this case, as described above, in the external member 60, the holes 63a are bored in two locations for each of the pair of the second wall parts 63, the respective holes 63a are arranged in positions deviated to one side from the center of the pair of first wall parts 62 that oppose to each other (refer to FIG. 4(a)), and therefore, similarly to the case of the first embodiment, working failure (installation failure) in setting the external member 60 to the rubber vulcanizing mold 4300 can be surely suppressed.

Also, in the pair of second wall parts 63, because the holes 63a are bored in two locations for each, in the rubber vulcanizing step, in a state the external members 60 are set to the lower mold 4301, rotation of such external members 60 can be surely restricted. Accordingly, in clamping the upper mold 4302 to the lower mold 4301, the respective rubber upper mold pins 302b can be surely inserted into the respective holes 63a.

Further, because the rubber lower mold pins 301b and the rubber upper mold pins 302b are respectively inserted into the respective holes 63a of each of the pair of the second wall parts 63, the external members 60 can be surely held inside the cavity of the rubber vulcanizing mold 4300, and therefore deformation of the external members 60 due to the vulcanizing pressure applied through the rubber-like elastic body can be suppressed.

Also, even in a constitution that the holes 63a, the rubber lower mold pins 301b and the like are arranged by plural numbers as described above in order to suppress the installation failure and deformation of the external member 60, because the holes 63a, the rubber lower mold pins 301b and the like are formed into a simple shape of a circular cross section, manufacture thereof is easy, and the product cost of the vibration isolation device 4001 and the rubber vulcanizing mold 4300 can be reduced.

Because the respective covering rubbers 51, 52 and the second wall covering rubber 4053 covering the external member 60 are formed of a rubber-like elastic body continuing to the vibration isolation leg part 50, the vibration isolation leg part 50, the respective covering rubbers 51, 52 and the second wall covering rubber 4053 can be vulcanizingly molded simultaneously, and the production cost can be reduced correspondingly. Also, by forming the respective covering rubbers 51, 52 and the second wall covering rubber 4053 in this way, the entire external member 60 can be covered with the rubber-like elastic body, and therefore corrosion resistance of the external member 60 can be improved.

Here, because the external member 60 arranged inside the cavity of the rubber vulcanizing mold 4300 forms a gap between the rubber vulcanizing mold 4300 over the entire surface by the thickness of the respective covering rubbers 51, 52 and the second wall covering rubber 4053 that cover the outer surface thereof, the external member 60 is liable to be deformed by the vulcanizing pressure applied through the rubber-like elastic body. Particularly, deformation of the base plate part 61 becomes conspicuous compared to that of the second wall parts 63 supported by the rubber lower mold pins 301b and the like. On the other hand, in the vibration isolation device 4001 in the present embodiment, because the through hole 61a is penetratingly formed in the base plate part 61, the vulcanizing pressure applied through the rubber-like elastic body can be released by the through hole 61a, and, as a result, deformation of the external member 60 can be suppressed.

Figure 22:
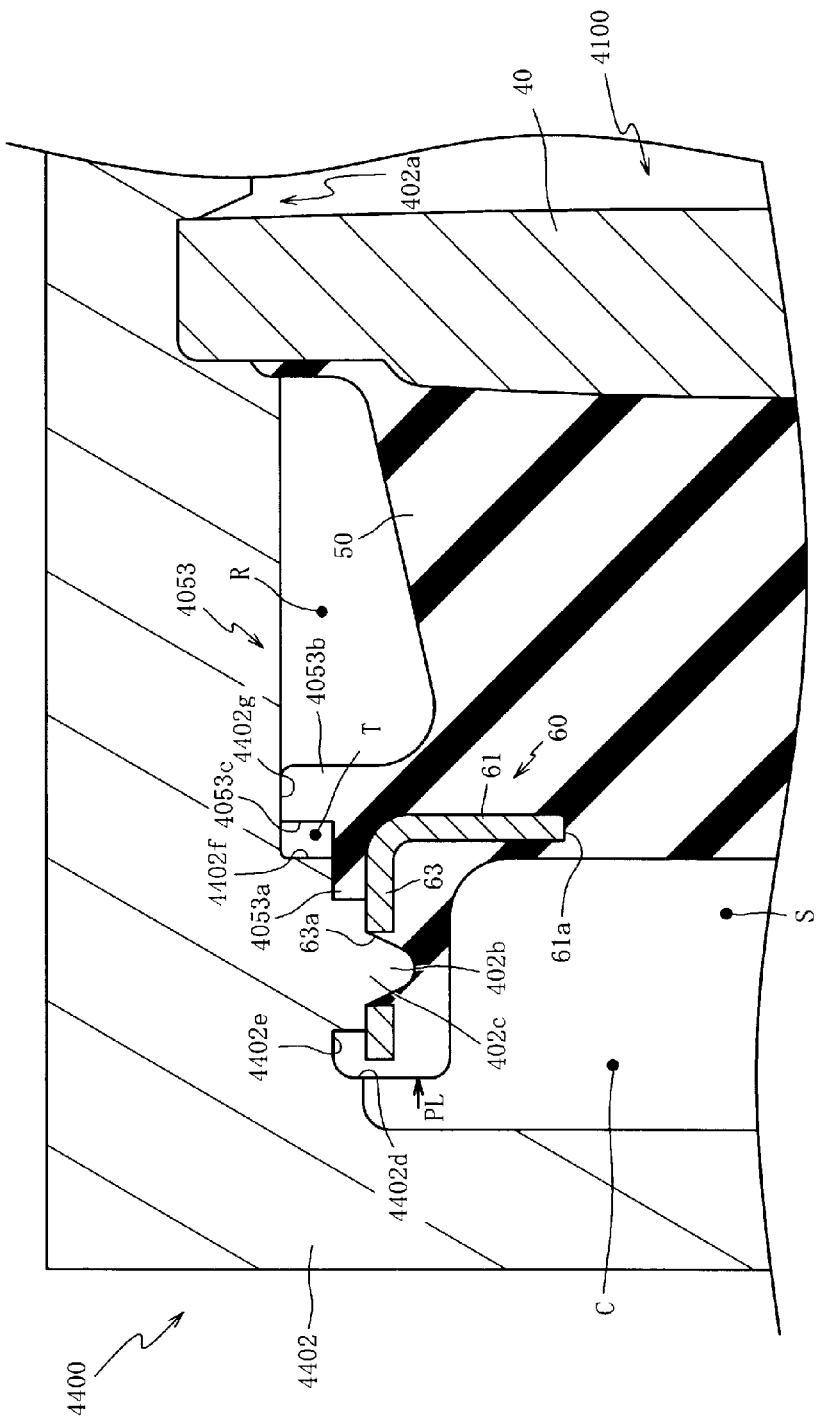
FIG. 22 is a cross-sectional view of the resin molding mold set with the first molded body and clamped.
Figure 23:
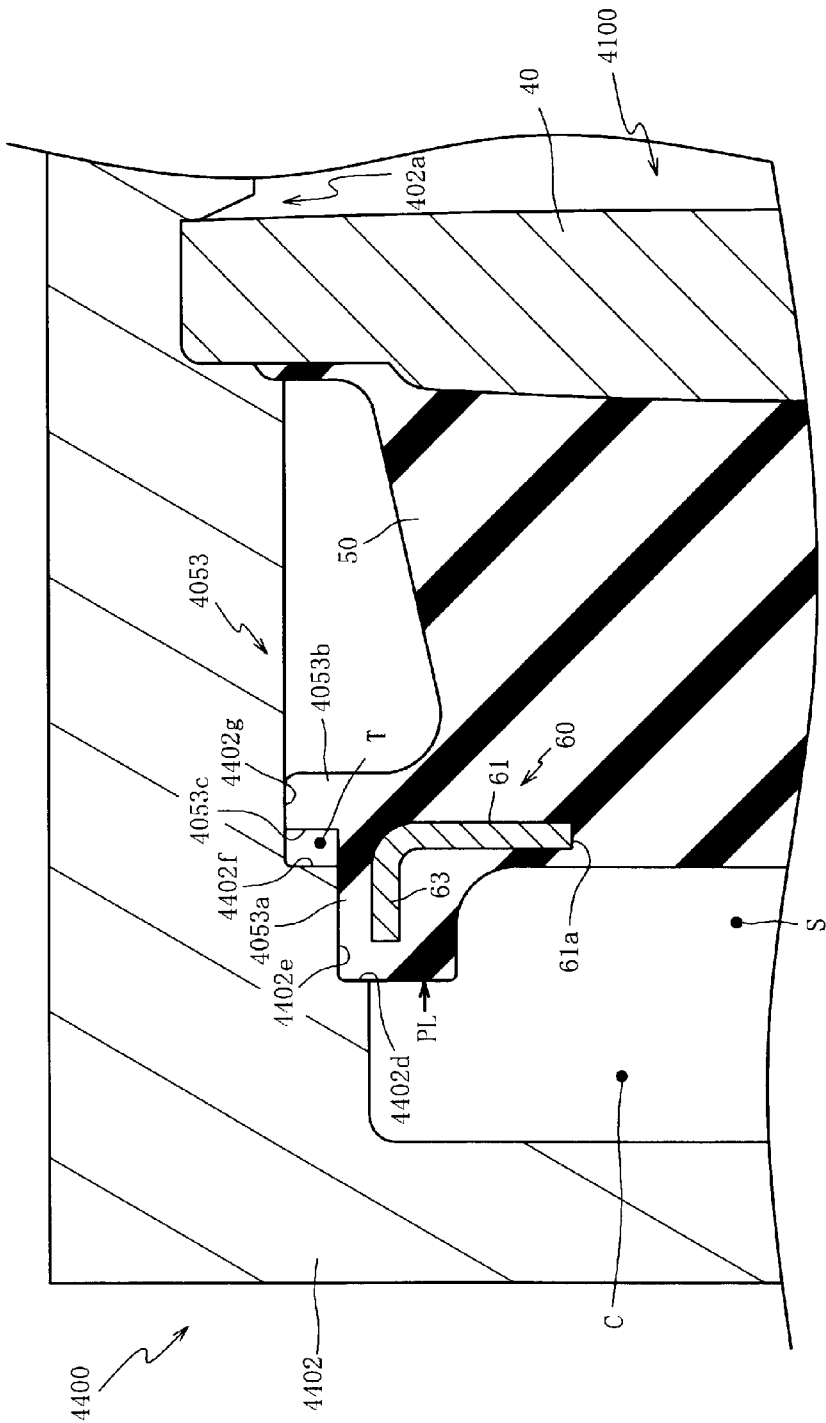
FIG. 23 is a cross-sectional view of the resin molding mold set with the first molded body and clamped.

Also, in the rubber vulcanizing mold 4300, the position of the split surfaces of the upper and lower molds 4301, 4302 and the middle mold 4303 are set so that the position of the parting line (PL) of the first molded body 4100 (the burs formed on the surface of the first molded body 4100 along the mating surface of the lower mold 4301 and the middle mold 4303 and the mating surface of the upper mold 4302 and the middle mold 4303; refer to FIG. 22 and FIG. 23) falls on the inner side of the second wall part 63 of the external member 60 (that is the through hole 61a side).

Next, in the resin molding step, the first molded body 4100 is set to the lower mold 4401 of the resin molding mold 4400, and the upper mold 4402 is then moved down for clamping. Thus, as shown in FIG. 21, because the cavity C is formed which is a space to fill a resin material for solidification, by pouring (injecting) the resin material into the cavity C from a pouring hole not shown and holding for a predetermined period of time, the resin material is solidified, and the first molded body 4100 is insert-molded to the bracket member 30. Finally, by press-fitting the bushes into the press-fitting holes of the bracket member 30, manufacturing of the vibration isolation device 4001 is completed.

In this case, because setting of the first molded body 4100 to the lower mold 4401 of the resin molding mold 4400 is performed by inserting the resin lower mold pins 401b into the holes 63a bored in the second wall parts 63 of the external member 60, similarly to the case of the rubber vulcanizing step described above, unless the orientation of the first molded body 4100 (that is the orientation of the external member 60) is correctly set and the resin lower mold pins

401b corresponding to each of the respective holes 63a are inserted respectively, the first molded body 4100 cannot be stored inside the cavity (recess) of the lower mold 4401. Accordingly, even when the through hole 61a of the external member 60 is formed in a deviated position and the first molded body 4100 has directivity, working failure (installation failure) in setting such first molded body 4100 to the resin molding mold 4400 can be surely suppressed.

Also, similarly to the case of the rubber vulcanizing step described above, in a state the first molded body 4100 is set to the lower mold 4401, by inserting the resin lower mold pins 401b into each of the holes 63a in two locations of the second wall part 63, rotation of the first molded body 4100 can be surely restricted. Accordingly, in clamping the upper mold 4402 to the lower mold 4401, the respective resin upper mold pins 402b can be surely inserted into the respective holes 63a.

Further, because the resin lower mold pins 401b and the resin upper mold pins 402b are respectively inserted into the respective holes 63a of each of the pair of second wall parts 63, the external member 60 can be securely held inside the cavity of the resin molding mold 4400, and therefore deformation of the external member 60 due to the injection pressure of the resin material injected into the cavity can be suppressed.

Furthermore, similarly to the case of the rubber vulcanizing step described above, because the resin lower mold pins 401b and the resin upper mold pins 402b are formed into a simple shape of a circular cross section, manufacture thereof is easy, and the product cost of the resin molding mold 4400 can be reduced.

Here, in the rubber vulcanizing step, the second wall parts 63 of the external member 60 are supported by the rubber lower mold seat part 301c and the rubber upper mold seat part 302c. The seat surfaces of these rubber lower mold seat part 301c and the rubber upper mold seat part 302c are concentric with the holes 63a and of a ring-shape with a smaller diameter than that of the swelled out part of the second wall part 63, therefore do not come out beyond the outer edge of the second wall part 63, and fall within the plate surface of the second wall part 63. Accordingly, in the second wall covering rubber 4053 covering the second wall part 63, only the vicinity of the holes 63a is partly recessed, and the recess is not formed in four corners.

That is, according to the conventional manufacturing method, because four corners of the second wall parts 63 are supported by a rubber vulcanizing mold, the structure and shape of the resin molding mold become complicated as described above, and the production cost increases. On the other hand, according to the manufacturing method in the present embodiment, similarly to the case of the first embodiment, the structure and shape of the resin molding mold 4400 can be simplified, and the production cost can be reduced.

Also, when the structure is such that the four corners of the second wall part 63 are supported by the rubber vulcanizing mold as in the conventional manufacturing method, if there is a round shape by bending work between the second wall part 63 and the base plate part 61, the positional accuracy of the external member 60 with respect to the rubber vulcanizing mold deteriorates as described above. On the other hand, according to the method for manufacturing in the present embodiment, similarly to the case of the first embodiment, the positional accuracy with respect to the rubber vulcanizing mold 4300 can be improved. As a result, because the relative positional accuracy of the external member 60 and the inner cylinder member 40 or the vibration isolation leg part 50 can be improved, static and dynamic characteristics of the vibration isolation device 4001 can be stabilized.

Here, in the first molded body 4100 molded in the rubber vulcanizing step, the space S is formed in a portion surrounded by the first wall parts 62 and the second wall parts 63 of the external member 60 (that is the portion surrounded by the first wall covering rubbers 52 and the second wall covering rubbers 4053). When a resin material is poured into the cavity of the resin molding mold in the resin molding step, the resin material is filled in the space S. As a result, the first molded body 4100 is insert-molded to the bracket member 30 in a state a part of the bracket member 30 is internally fit to the space S.

In this case, because the through hole 61a is penetratingly formed in the base plate part 61 of the external member 60, in the resin molding step, the pouring (injecting) pressure of the resin material poured into the cavity of the resin molding mold can be applied to the vibration isolation leg part 50 through the through hole 61a. Thus, pre-compression can be imparted to the vibration isolation leg part 50, and therefore the vibration isolation leg part 50 excellent in durability can be manufactured.

Also, because the pre-compression amount imparted to the vibration isolation leg part 50 can be changed by changing the pouring pressure of the resin material, similarly to the case of the first embodiment, the spring characteristic of the vibration isolation leg part 50 can be adjusted in manufacturing the vibration isolation device 1.

Also, because the pre-compression amount imparted to the vibration isolation leg part 50 can be changed by changing the pouring pressure of the resin material, similarly to the case of the first embodiment, the spring characteristic of the vibration isolation leg part 50 can be adjusted in manufacturing the vibration isolation member 1.

Further, by increasing the pouring (injecting) pressure of such resin material for example, similarly to the case of the first embodiment, an internally fitting state can be formed in which the resin material is fit in the vibration isolation leg part 50 while penetrating the through hole 61a (however, in FIG. 24 and FIG. 25 described below, a molding state of a case the pouring pressure of the resin material is low is illustrated). Accordingly, when such internally fitting state is formed, the vibration isolation device 4001 capable of surely preventing coming-off of the external member 60 from the bracket member 30 can be manufactured.

Next, the seal structure in insert-molding the first molded body 4100 to the bracket member 30 by the resin molding mold 4400 will be described referring to FIG. 22 and FIG. 23. Also, because the seal structure by the lower mold 4401 is similar to the seal structure by the upper mold 4402, the upper mold 4402 will be described exemplarily, and description on the lower mold 4401 will be omitted.

FIG. 22 and FIG. 23 are cross-sectional views of the resin molding mold 4400 set with the first molded body 4100 and clamped, and illustrate a state before the resin material is poured into the cavity C. Also, FIG. 22 corresponds to an enlarged view of FIG. 21, and FIG. 23 corresponds to a cross-sectional view taken along a line XXIII-XXIII of FIG. 17(a). Further, in FIG. 22 and FIG. 23, the position of the parting line PL formed on the surface of the second wall covering rubber 4053 is illustrated by an arrow.

As shown in FIG. 22 and FIG. 23, the resin molding mold 4400 mainly includes a first pressing surface part 4402d pressing and sealing the side surface (the left side surface in FIG. 22 and FIG. 23) of the seal surface part 4053a of the second wall covering rubber 4053, a second pressing surface part 4402e arranged so as to continue to the first pressing surface part 4402d and pressing and sealing the upper surface of the seal surface part 4053a of the second wall covering rubber 4053, and a third pressing surface part 4402g arranged continuously through a vertical wall 4402f between the second pressing surface part 4402e and pressing and sealing the upper surface of the stopper surface part 4053b of the second wall covering rubber 4053.

The first pressing surface part 4402d is formed into a flat surface that is parallel to the side surface (the left side surface in FIG. 22 and FIG. 23) of the seal surface part 4053a, and the distance from the axis of the inner cylinder member 40 is made shorter than that of the side surface of the seal surface part 4053a. The second pressing surface part 4402e is formed into a flat surface that is parallel to the upper surface of the seal surface part 4053a, and the third pressing surface part 4402g is formed into a flat surface that is parallel to the upper surface of the stopper surface part 4053b. In these second pressing surface part 4402e and third pressing surface part 4402g, the opposing distance (the dimension in the up-down direction in FIG. 22 and FIG. 23) between the second pressing surface part and the third pressing surface part in the lower mold 4401 (neither is illustrated) is made shorter than the opposing distance (the dimension in the up-down direction in FIG. 22 and FIG. 23) between the upper surfaces of the pair of seal surface parts 4053a and the pair of stopper surface parts 4053b respectively. Also, in the present embodiment, the first pressing surface part 4402d is formed in parallel to the axial direction of the inner cylinder member 40, whereas the second pressing surface part 4402e and the third pressing surface part 4402g are formed orthogonal to the axial direction of the inner cylinder member 40.

Accordingly, in the resin molding step, when the upper mold 4402 is moved down in parallel to the axial direction of the inner cylinder member 40 and is clamped, the second pressing surface part 4402e of such upper mold 4402 presses the upper surface of the seal surface part 4053a of the second wall covering rubber 4053 toward the clamping direction (downward in FIG. 22 and FIG. 23). Thus, because the cavity C to which the resin material is poured and a space R on the side the stopper surface part 4053b is stored can be separated, generation of a bur by the resin material in insert-molding can be suppressed and the stopper function can be secured.

That is, as described above, because the seal surface part 4053a is formed into a flat surface shape orthogonal to the axial direction of the inner cylinder member 40 (that is the clamping direction) and the second pressing surface part 4402e of the upper mold 4402 presses such seal surface part 4053a toward the clamping direction, these second pressing surface part 4402e and seal surface part 4053a can be securely adhered to each other. Accordingly, the resin material poured into the cavity C can be suppressed from encroaching between the second pressing surface part 4402e and the seal surface part 4053a, and generation of a bur in insert-molding can be suppressed correspondingly.

Also, when adhesion between the second pressing surface part 4402e and the seal surface part 4053a can be made secure as described above, the dimensional accuracy of the pressing surface part other than the resin molding mold 4400 (the first pressing surface part 4402d and the third pressing surface part 4402g) and the seal surface part 4053a and the stopper surface part 4053b of the first molded body 4100 can be made loose correspondingly, and therefore the manufacturing cost of the resin molding mold 4400 and the rubber vulcanizing mold 4300 can be reduced.

Further, the stopper surface part 4053b is arranged so as to continue to the seal surface part 4053a through the step 4053c and the height dimension thereof is made larger than that of the seal surface part 4053a by the amount of the step 4053c (is protruded in the axial direction of the inner cylinder member 40), therefore even if the resin material poured into the cavity C encroaches between the second pressing surface part 4402e and the seal surface part 4053a and the resin material that has encroached becomes a bur, the stopper surface (the upper surface side; the upper side in FIG. 22 and FIG. 23) of the stopper surface part 4053b can be made to be apart from the bur by the amount of the step 4053c. Accordingly, even when a bur is generated, the stroke (compression allowance) of the stopper surface part 4053b can be secured, and the stopper function thereof can be exerted.

In this case, the second pressing surface part 4402e is formed so as to overlap with at least a part of the second wall part 63 of the external member 60 when viewed in the clamping direction of the resin molding mold 4400. That is, in the present embodiment, the vertical wall 4402f of the upper mold 4402 exists between the end on the side opposite to the base plate part 61 (the left side in FIG. 22 and FIG. 23) of the second wall part 63 and the base plate part 61.

Thus, when the upper mold 4402 is clamped and the second pressing surface part 4402e of such upper mold 4402 presses the upper surface of the seal surface part 4053a of the second wall covering rubber 4053 toward the clamping direction (downward in FIG. 22 and FIG. 23), the range overlapping with at least a part of the external member 60 (the second wall part 63) is pressed, and therefore it is possible to make the external member 60 formed of a metal material support the seal surface part 4053a that is pressed by the second pressing surface part 4402e from the back surface side thereof (the lower side in FIG. 22 and FIG. 23). Thus, because adhesion between the second pressing surface part 4402e and the seal surface part 4053a can be made stronger, the resin material poured into the cavity C can be suppressed from encroaching between the second pressing surface part 4402e and the seal surface part 4053a, and generation of a bur in insert-molding can be suppressed more securely correspondingly.

Also, in the present embodiment, when the resin molding mold 4400 is clamped, the first pressing surface part 4402d also presses the side surface (the left side surface in FIG. 22 and FIG. 23) of the seal surface part 4053a of the second wall covering rubber 4053. Accordingly, because the side surface of the seal surface part 4053a can be sealed, the resin material poured into the cavity C can be more securely stopped from reaching the gap between the second pressing surface part 4402e and the upper surface of the seal surface part 4053a by such sealing. As a result, the event that the stopper function is impaired due to generation of a bur in insert-molding can be suppressed more securely.

On the other hand, the first pressing surface part 4402d does not press the entire range of the side surface (the left side surface in FIG. 22 and FIG. 23) of the seal surface part 4053a, but presses only a range positioned at least on the upper surface side (the surface on the upper side in FIG. 22 and FIG. 23) of the seal surface part 4053a of the parting line PL. Thus, when the first molded body 4100 is insert-molded to the bracket member 30 in the resin molding step, the parting line PL can be covered with the resin (can be embedded inside the bracket member 30). As a result, the parting line PL can be hidden from the outer appearance of the vibration isolation device 4001, the appearance of the product can be improved, and the event that a crack is generated in the first molded body 4100 starting from the parting line PL can be suppressed.

Here, in the present embodiment, the resin molding mold 4400 is formed so as to have a gap T as a space between the vertical wall 4402f that connects the second pressing surface part 4402e and the third pressing surface part 4402g and the step 4053c that connects the seal surface part 4053a and the stopper surface part 4053b. Thus, pads of the rubber-like elastic body pushed out because the seal surface part 4053a is pressed by the first pressing surface part 4402d and the second pressing surface part 4402e in clamping can be released to and absorbed by the gap T between the vertical wall 4402f and the step 4053c.

Thus, by releasing the pads, the first pressing surface part 4402d and the second pressing surface part 4402e and the seal surface part 4053a can be adhered securely to each other without being impaired by the pads. As a result, because the resin material poured into the cavity C can be suppressed from encroaching between the first pressing surface part 4402d and the second pressing surface part 4402e and the seal surface part 4053a, generation of a bur in insert-molding can be more securely suppressed correspondingly.

The detailed constitution of the vibration isolation device 4001 constituted as described above will be described referring to FIG. 24 and FIG. 25. FIG. 24 and FIG. 25 are partial cross-sectional views of the vibration isolation device 4001, and correspond to the cross sections shown in FIG. 18(*a*) and FIG. 18(*b*) respectively. Also, in FIG. 24, the counterpart parts 500 are illustrated which are arranged so as to oppose the second wall covering rubbers 4053 when the vibration isolation device 4001 is assembled to a vehicle. Further, in FIG. 25, a part of the vibration isolation device 4001 is partially and enlargingly illustrated, and in such enlarged portion, in order to simplify the drawing, illustration of the cross-sectional line of the bracket member 30 and the respective covering rubbers 51, 52 is omitted.

Figure 25:
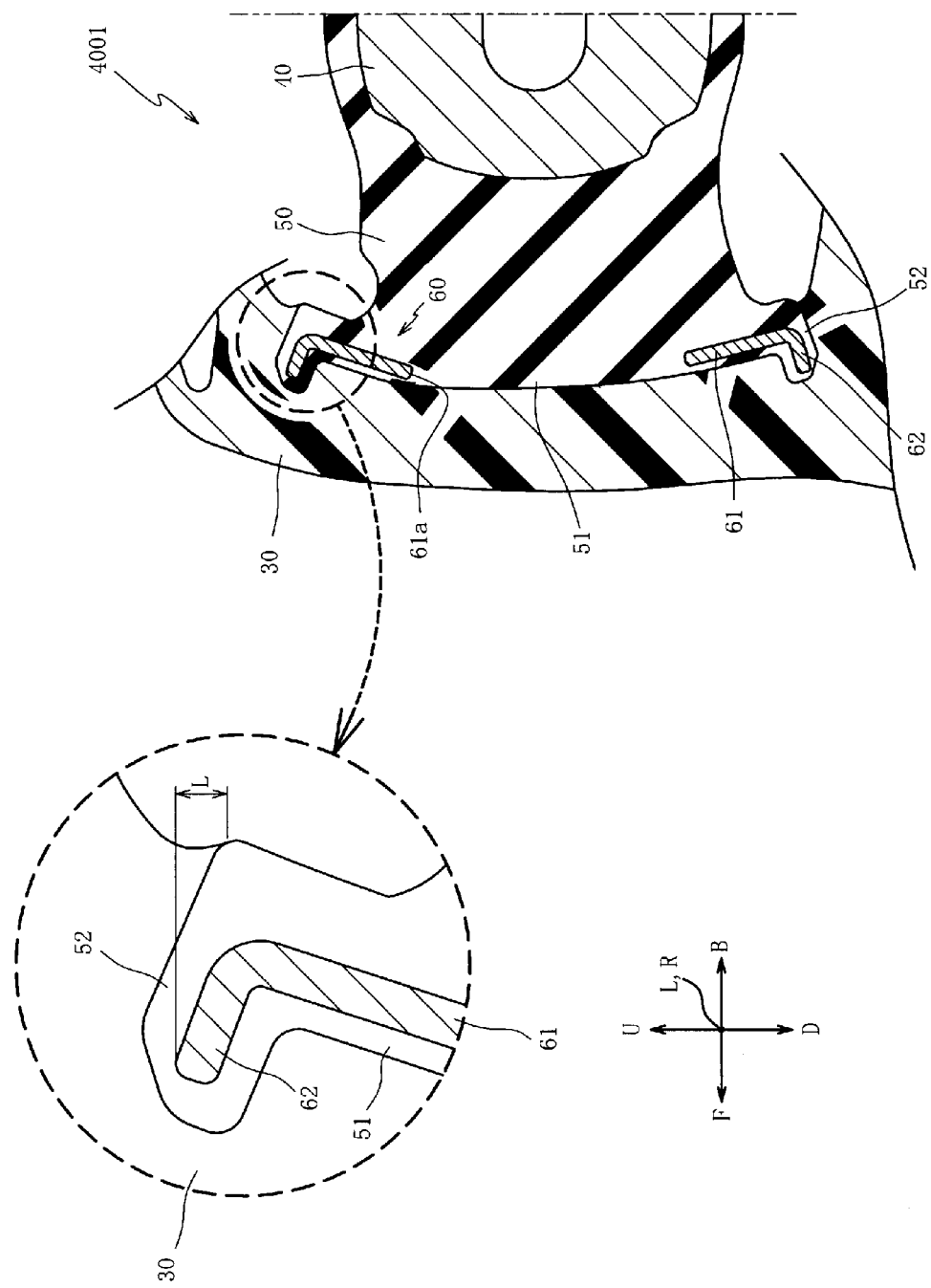
FIG. 25 is a partial cross-sectional view of the vibration isolation device.
Figure 26:
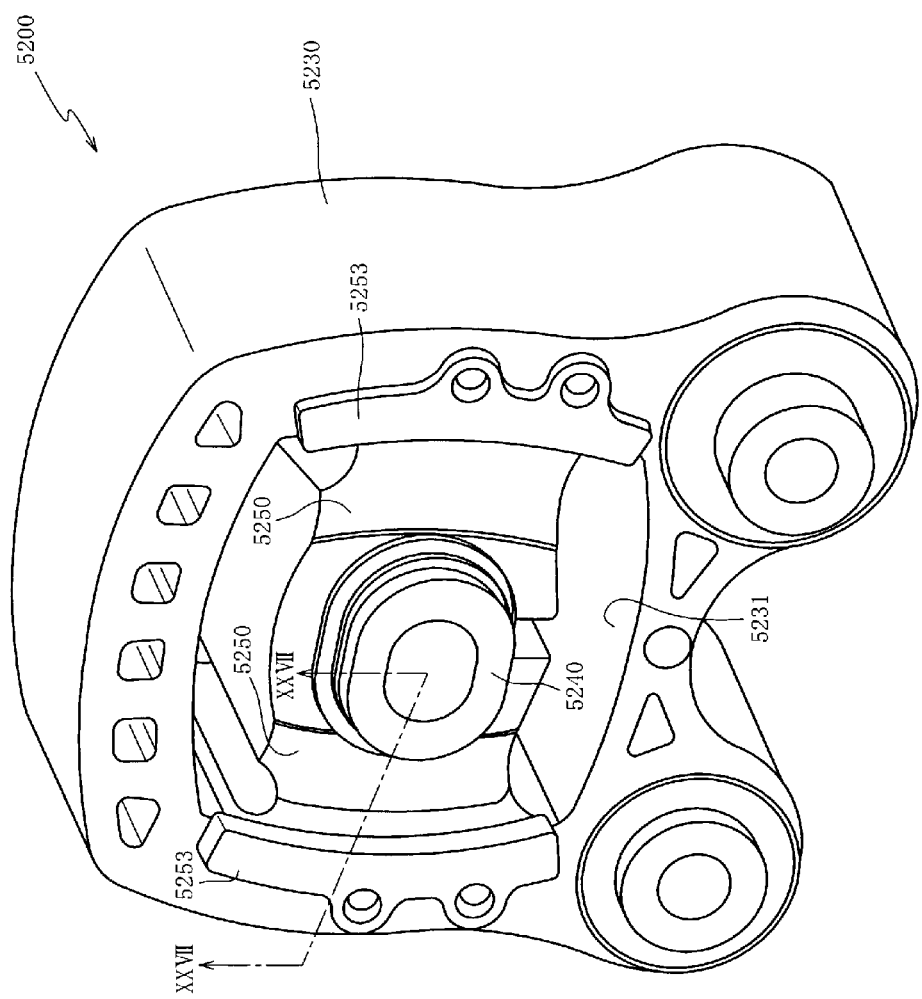
FIG. 26 is a perspective view of a conventional vibration isolation device.
Figure 27:
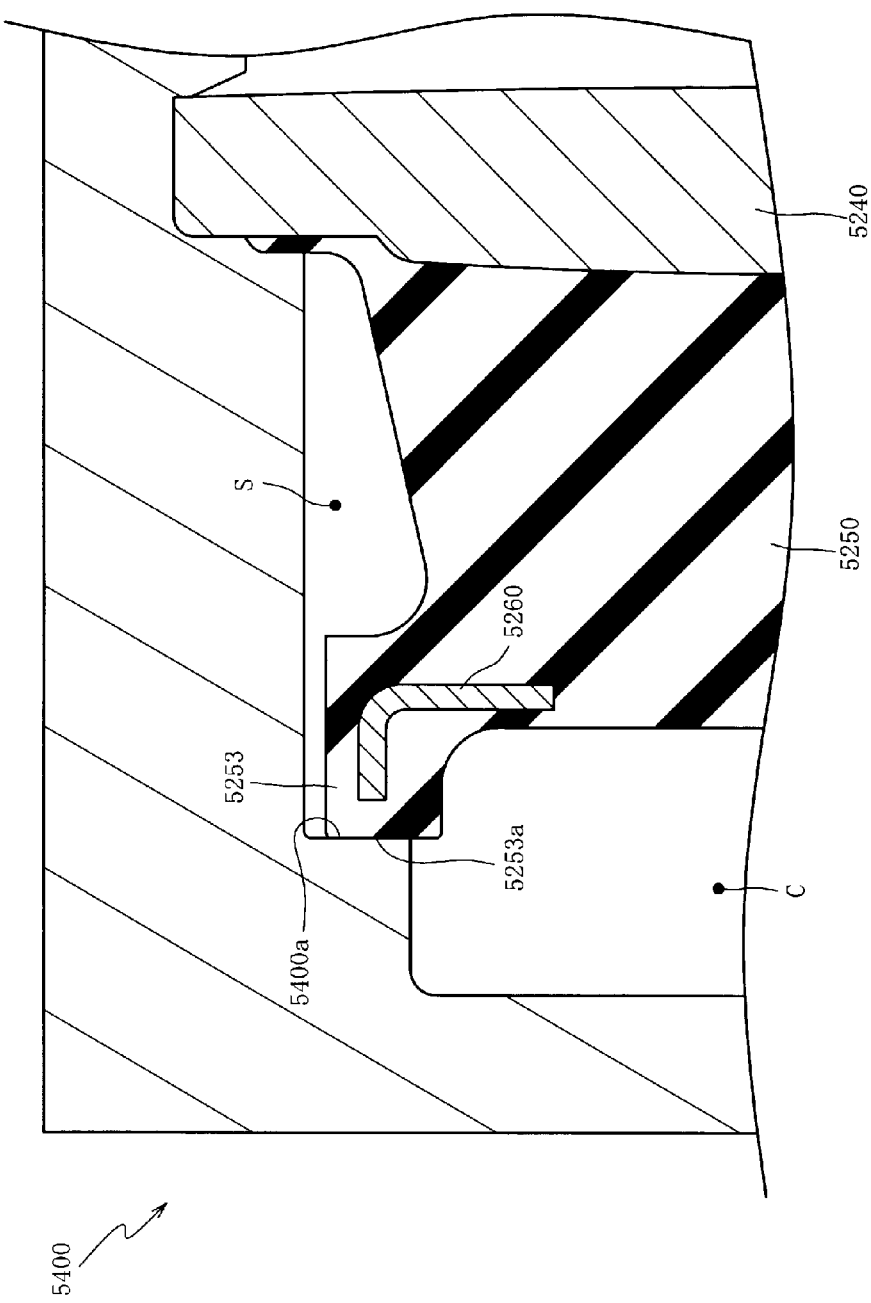
FIG. 27 is a cross-sectional view of a clamped resin molding mold.

As shown in FIG. 24 and FIG. 25, the other end side of the vibration isolation leg part 50 (the left side in FIG. 24 and FIG. 25) is vulcanizingly adhered to the back surface side of the base plate part 61, the pair of first wall parts 62 are extended in a tapered shape and the pair of second wall parts 63 are extended maintaining a parallel state from the outer edge of the base plate part 61 toward the bracket member 30 (that is toward the opposite side of the vibration isolation leg part 50), and the first wall parts 62 and the second wall parts 63 are embedded in the bracket member 30 while being connected to each other in the peripheral direction (that is along the outer edge of the base plate part 61).

Accordingly, respective movement of the external member 60 in the vehicle left and right directions (the directions of the arrows L, R; the up and down directions in FIG. 24) with respect to the bracket member 30, movement of the external member 60 in the vehicle up and down directions (the directions of the arrows U, D; the up and down directions in FIG. 25) with respect to the bracket member 30, and movement of the external member 60 in the vehicle front and back directions (the directions of the arrows F, B; the left and right directions in FIG. 25) and the direction of coming-off from the bracket member 30 (the right direction in FIG. 25) with respect to the bracket member 30 can be restricted by engagement of the respective members similarly to the case of the first embodiment.

As described above, because of the construction that engagement of the external member 60 and the bracket member 30 in the vehicle front and back direction is attained by embedding the pair of first wall parts 62 of the external member 60 in the bracket member 30, similarly to the case of the first embodiment, the structure of the resin molding mold 4400 that molds the bracket member 30 can be simplified.

Also, in the vibration isolation device 4001, similarly to the case of the first embodiment, even when the inner cylinder member 40 is displaced in any direction, the engaged state of the external member 60 and the bracket member 30 can be maintained, and such external member 60 can be prevented from coming-off from the bracket member 30.

Here, the external member 60 can be manufactured simply as described above while allowing restriction of movement with respect to the bracket member 30 in respective directions. Accordingly, the production cost of the external member 60 can be reduced, and the product cost of the total vibration isolation device 4001 can be reduced correspondingly.

In this case, because the first wall parts 62 and the second wall parts 63 are formed so as to continue to each other in the peripheral direction, the plate thickness of the external member 60 can be reduced similarly to the case of the first embodiment, therefore the material cost can be reduced, and the weight can be reduced.

Also, as described above, because the stopper surface part 4053b of the second wall covering rubber 4053 covering the second wall part 63 is formed so as to protrude from the outer surface of the bracket member 30 toward the counterpart part 500 side, such stopper surface part 4053b of the second wall covering rubber 4053 can be utilized as a stopper part that abuts on the counterpart part 500 and restricts the displacement thereof. In this case, because the flat plate-shape second wall parts 63 whose one pair is arranged in parallel are embedded in the vicinity of the stopper surface parts 4053b in the second wall covering rubber 4053, the impact force generated when the counterpart part 500 is abutted on can be received by the second wall parts 63, and the load of the bracket member 30 can be reduced. Thus, even when the bracket member 30 is formed of a resin material, durability thereof can be improved.

Further, as described above, in the second wall part 63, the end thereof is connected to the end of the second wall part 62 and the strength in the bending direction is increased, therefore the impact force generated when the counterpart part 500 is abutted on can be received securely, and durability of not only the external member 60 itself but also of the bracket member 30 can also be increased.

The present invention has been described above based on the embodiments; however, it can be easily presumed that the present invention is not limited to the embodiments described above by any means, and a variety of improvements and alterations are possible within the scope not departing from the objects of the present invention.

The figures cited in the respective embodiments are of an example only, and it is a matter of course that other figures can be adopted. For example, in the first and fourth embodiments, the case that the holes 63a are bored in four locations in total in the pair of second wall parts 63 has been described; however it may be three locations or less in total, or may be five locations or more in total. For example, it may be constituted that the holes 63a are bored in two locations in one of the pair of second wall parts 63 and in one location in the other. The reason is that by the minimum number of arrangement, rotation and falling of the external member 60 in the rubber vulcanizing step can be surely prevented. It is similar in the second and third embodiments also, and the number of arrangement of the respective holes 2063a, 3063a can be set optionally.

Also, as the respective embodiments, the numbers of arrangement of the holes 63a, 2063a, 3063a formed in the respective pairs of second wall parts 63, 2063, 3063 are made an equal number, thereby drawing work and boring work can be performed symmetrically, and the working accuracy thereof can be improved.

In the respective embodiments, the case has been described in which the external members 60, 2060, 3060 are press-formed by drawing work using a press machine from one flat raw plate; however the present invention is not necessarily limited to it, and it is a matter of course that other methods for forming can be adopted.

Also, as the other methods for forming, a method for forming by welding and fixing multiple plate materials, a method for forming by machining of a raw material of a rectangular parallelepiped, and the like can be exemplified for example. In this case, the external member is not necessarily of a container shape as in the respective embodiments. For example, it may be configured that a base part of a bar-like body tapered toward the distal end (that is, the cross-sectional area increases as it goes toward the distal end) is securely adhered (welded and fixed for example) to the front surface of the base plate part 61 (the opposite side of the back surface to which the vibration isolation leg part 50 is connected) and such bar-like body is embedded in the bracket member 30. With this configuration also, movement in the respective directions of the external member with respect to the bracket member 30 can be restricted, and coming-off thereof can be prevented.

Further, in the respective embodiments, the case has been described in which the entirety of the pair of first wall parts 62 opposing to each other are extended so as to be tapered as it becomes apart from the base plate part 61 (that is, the entirety of the pair of first wall parts 62 expands the opposing distance thereof); however the present invention is not necessarily limited to it, and at least a part of the pair of first wall parts 62 only has to be engageable with the bracket member 30. Also, being engageable means that, when the external member 60 is to be displaced toward the direction the first wall part 62 is drawn out from inside the bracket member 30, movement of the first wall part 62 toward the drawing out direction is restricted by the resin material of the bracket member 30. Accordingly, it may be configured also that the pair of first wall parts 62 for example are formed so that sections on the base plate 61 side (the right side in FIG. 4(a)) are parallel to each other and only the remaining sections (the sections on the opposite side of the base plate part 61; the left side in FIG. 4(a)) are formed into a tapered shape (the shape in which the opposing distance gradually increases). Or, the pair of first wall parts 62 may also be formed so as to have the portions formed parallel to each other and extended to the same height position as that of the second wall parts 63 and the flange-like portions folded back outward or inward from the extended ends of said portions (the left side ends in FIG. 4(a)). The reason is that the pair of first wall parts 62 becomes engageable with the bracket member 30 in either shape.

Also, in the respective embodiments, the case has been described in which the ends of the pair of first wall parts 62 and the pair of second wall parts 63 are connected to each other (are formed so as to continue to each other in the peripheral direction); however the present invention is not necessarily limited to it, and it is a matter of course that the vibration isolation device can be formed without connecting some or any of the ends of these first wall parts 62 and second wall parts 63 to each other.

In the respective embodiments, the case the through hole 61a is penetratingly formed in the base plate part 61 has been described; however the present invention is not necessarily limited to it, and formation of such through hole 61a may be omitted. Also, the shape of the through hole 61a is not necessarily a rectangular shape in a front view, may be a curved shape such as a circular shape and an elliptical shape, or may also be a triangle shape and a polygonal shape of a pentagon or above. Further, the number of arrangement thereof may also be set by any number.

Also, in the respective embodiments, the case has been described in which the external members 60, 2060, 3060 are embedded in the other end side of the vibration leg parts 50; however the present invention is not necessarily limited to it, and embedding of such external members 60, 2060, 3060 may be omitted. That is, the vibration isolation device 1, 4001 may be manufactured by setting the inner cylinder member 40 only to the rubber vulcanizing mold 300 and vulcanizingly molding the first molded body 100, 4100 in a state the external members 60 are omitted in the rubber vulcanizing step, then setting the first molded body 100, 4100 to the resin molding mold 400, 4400 for insert-molding.

In this case, the respective pins 301b, 302b, 401b, 402b such as the rubber lower mold pins 301b, the resin lower mold pins 401b and the like and the respective seat parts 301c, 302c, 401c, 402c such as the rubber lower mold seat parts 301c, the resin lower mold seat parts 402c and the like are omitted. Even in this case, coming-off of the vibration isolation leg parts 50 from the bracket member 30 can be suppressed similarly to the case of embedding the external members 60 by internal fitting of the bracket member 30 to the space S formed so as to be recessed on the other end side of the vibration isolation leg parts 50 (refer to FIG. 10 and FIG. 21) and engagement with the bracket member 30 by inclination of the first wall covering rubbers 52 (refer to FIG. 12 and FIG. 25).

Also, in the fourth embodiment, the case that the first pressing surface part 4402d is arranged has been described; however the present invention is not necessarily limited to it, and formation of the first pressing surface part 4402d may be omitted. That is, in FIG. 22 and FIG. 23, the second pressing surface part 4402e and the upper surface of the cavity C (the surface on the upper side in FIG. 22 and FIG. 23) may be formed flush. Or otherwise, the upper surface of the cavity C may be at a height position between the second pressing surface part 4402e and the third pressing surface part 4402g.

Similarly, in the fourth embodiment, the case that the third pressing surface part 4402g is arranged has been described; however the present invention is not necessarily limited to it, and formation of the third pressing surface part 4402g may be omitted. That is, it may also be constituted that, in clamping, a gap is provided between the third pressing surface part 4402g and the upper surface of the stopper surface part 4053b (the surface on the upper side in FIG. 22 and FIG. 23).

Also, in the fourth embodiment, the case that the gap T is arranged between the vertical wall 4402f and the step 4053c has been described (refer to FIG. 22 and FIG. 23); however the present invention is not necessarily limited to it, and it may be constituted that such gap T is not arranged and the vertical wall 4402f presses the step 4053c.

REFERENCE SIGNS LIST 1, 4001 vibration isolation device
30 bracket member
31 insertion hole
40 inner cylinder member
50 vibration isolation leg part
51 base plate covering rubber (a part of covering rubber parts)
52 first wall covering rubber (a part of covering rubber parts)
53, 4053 second wall covering rubber (a part of covering rubber parts, covering rubber parts covering the second wall parts, protruded rubber parts)
4053a seal surface part
4053b stopper surface part 4053c step
60, 2060, 3060 external member base plate part
61a through hole
62 first wall parts (a part of extended wall part)
63, 2063, 3063 second wall parts (a part of extended wall part)
63a hole (a part of insertion hole)
2063a, 3063a hole (insertion hole)
100, 4100 first molded body
300, 4300 rubber vulcanizing mold
301b rubber lower mold pin (a part of rubber mold insertion part, insert pin)
302b rubber upper mold pin (a part of rubber mold insertion part, insert pin)
400, 4400 resin molding mold
401b resin lower mold pin (a part of resin mold insertion part, insert pin)
402b resin upper mold pin (a part of resin mold insertion part, insert pin)
4402e second pressing surface part (pressing surface part)
4402f vertical wall
S space
R space (space where the stopper surface is stored)
C cavity
T gap

The invention claimed is:

1. A vibration isolation device, comprising:
a cylindrical inner cylinder member that is attached on one of a vibration generation body side or a vehicle body side;
a bracket member that includes an insertion hole where the inner cylinder member is insertingly arranged, is formed of a resin material, and is attached on the other of the vibration generation body side or the vehicle body side; and
a pair of vibration isolation leg parts formed of an elastic body with one end sides connected to the outer peripheral surface of the inner cylinder member and with the other end sides connected to the inner peripheral surface of the insertion hole,
wherein a pair of external members is provided which is formed of a metal material, to which the other end sides of the pair of vibration isolation leg parts are vulcanizingly adhered respectively, and whose portions respectively embedded in the bracket member are engaged with the bracket member;
the other end sides of the vibration isolation leg parts are connected to the inner periphery side of the insertion hole by engagement of the external members and the bracket member,
wherein the external member includes:
a base plate part to which the other end side of the vibration isolation leg part is vulcanizingly adhered; and
an extended wall part extended from the outer edge of the base plate part toward the bracket member, formed continuously in the peripheral direction, and with at least two locations that oppose to each other engageably embedded in the bracket member,
wherein a part of the bracket member is internally fit to the inner periphery side of the extended wall part.

2. The vibration isolation device according to claim 1,
wherein the bracket member is formed by insert-molding in which a resin material is poured into a resin molding mold in which the external members and the vibration isolation leg parts vulcanizingly adhered to the external members are provided; and
the external member is penetratingly formed with a through hole in the base plate part.

3. The vibration isolation device according to claim 2 further comprising:
covering rubber parts formed of an elastic body that cover the outer surfaces of the external members and continue to the vibration isolation leg parts,
wherein the extended wall part of the external member includes a pair of first wall parts arranged so as to oppose to each other with at least a part of each embedded in the bracket member and a pair of second wall parts that connects the ends of the pair of first wall parts to each other, is arranged so as to oppose to each other embracing the bracket member, and is formed into a flat plate shape; and
the covering rubber parts that cover the second wall parts are protruded from the outer surface of the bracket member.

4. The vibration isolation device according to claim 3,
wherein the covering rubber parts that continue to the pair of vibration isolation leg parts are connected to the inner periphery side of the insertion hole of the bracket member by insert-molding; and
the covering rubber part that covers the second wall part includes a flat surface-shape seal surface part positioned on the outer edge side and a stopper surface part arranged so as to continue to the seal surface part through a step and protruded from the seal surface part by an amount of the step, and is insert-molded on the inner periphery side of the insertion hole of the bracket member in a state separating a cavity to which the resin material is poured and a space where the stopper surface part is stored by a pressing surface part of a resin molding mold pressing the seal surface part.

5. A vibration isolation device, comprising:
a cylindrical inner cylinder member that is attached on one of a vibration generation body side or a vehicle body side;
a bracket member that includes an insertion hole where the inner cylinder member is insertingly arranged, is formed of a resin material, and is attached on the other of the vibration generation body side or the vehicle body side; and
a pair of vibration isolation leg parts formed of an elastic body with one end sides connected to the outer peripheral surface of the inner cylinder member and with the other end sides connected to the inner periphery side of the insertion hole of the bracket member by insert-molding,
wherein the vibration isolation leg parts include protruded rubber parts formed on the side surface on the other end sides insert-molded on the inner periphery side of the insertion hole of the bracket member and protruded from the outer surface of the bracket member;
the protruded rubber part includes a flat surface-shape seal surface part positioned on the outer edge side and a stopper surface part arranged so as to continue to the seal surface part through a step and protruded from the seal surface part by an amount of the step; and
the other end side of the vibration isolation leg part is insert-molded on the inner periphery side of the insertion hole of the bracket member in a state separating a cavity to which the resin material is poured and a space where the stopper surface part of the protruded rubber part is stored by a pressing surface part of a resin molding mold pressing the seal surface part of the protruded rubber part.

6. A manufacturing method of a vibration isolation device for manufacturing a vibration isolation device that includes a cylindrical inner cylinder member that is attached on one of a vibration generation body side or a vehicle body side, a bracket member that includes an insertion hole where the inner cylinder member is insertingly arranged, is formed of a resin material, and is attached on the other of the vibration generation body side or the vehicle body side, and a pair of vibration isolation leg parts formed of an elastic body with one end sides connected to the outer peripheral surface of the inner cylinder member and with the other end sides connected to the inner periphery side of the insertion hole of the bracket member, comprising:

- a rubber vulcanizing step for molding a first molded body with one end sides of the pair of vibration isolation leg parts vulcanizingly adhered to the outer peripheral surface of the inner cylinder member by pouring an elastic body into a cavity of a rubber vulcanizing mold arranged with the inner cylinder member for vulcanizingly molding; and
- a resin molding step for insert-molding the other end sides of the vibration isolation leg parts of the first molded body to the inner periphery side of the insertion hole of the bracket member by pouring a resin material into a cavity of a resin molding mold arranged with the first molded body molded in the rubber vulcanizing step for solidification, wherein the first molded body molded in the rubber vulcanizing step includes protruded rubber parts formed on the side surfaces on the other end sides of the vibration isolation leg parts insert-molded on the inner periphery side of the insertion hole of the bracket member and protruded from the outer surface of the bracket member, and the protruded rubber part includes a flat surface-shape seal surface part positioned on the outer edge side and a stopper surface part arranged so as to continue to the seal surface part through a step and protruded from the seal surface part by an amount of the step; and a resin molding mold used in the resin molding step includes pressing surface parts that press the seal surface parts in the protruded rubber parts of the first molded body and separate a cavity to which the resin material is poured and a space where the stopper surface part in the protrusion rubber part of the first molded body is stored by the pressing surface parts pressing the seal surface parts.

7. The manufacturing method of a vibration isolation according to claim 6, wherein the vibration isolation device includes external members embedded in the other end side of the vibration isolation leg parts, is formed of a metal material, and with at least a part thereof engaged with the bracket member;

the rubber vulcanizing step includes pouring an elastic body into a cavity of a rubber vulcanizing mold arranged with the external members along with the inner cylinder member for vulcanizingly molding, thereby connecting one end sides of the pair of vibration isolation leg parts to the outer peripheral surface of the inner cylinder member and embedding the external members in the other end sides of the pair of vibration isolation leg parts; and the resin molding step includes pressing ranges that are seal surface parts of the protrusion rubber parts and overlap with at least a part of the external members by pressing surface parts of the resin molding mold.

8. The manufacturing method of a vibration isolation device according to claim 6 or claim 7, wherein the resin molding mold used in the resin molding step has a predetermined gap between a vertical wall that continues to the pressing surface part and a step between a seal surface part and a stopper surface part of the first molded body.

\* \* \* \* \*